US010540492B1

(12) United States Patent
Norris, III

(10) Patent No.: US 10,540,492 B1
(45) Date of Patent: Jan. 21, 2020

(54) PASSWORD PATTERN RECOGNITION AUTHENTICATION METHOD

(71) Applicant: Forbes Holten Norris, III, Princeton, NJ (US)

(72) Inventor: Forbes Holten Norris, III, Princeton, NJ (US)

( * ) Notice: Subject to any disclaimer, the term of this patent is extended or adjusted under 35 U.S.C. 154(b) by 0 days.

(21) Appl. No.: 15/583,996

(22) Filed: May 1, 2017

Related U.S. Application Data

(60) Provisional application No. 62/358,562, filed on Jul. 5, 2016, provisional application No. 62/343,129, filed on May 31, 2016, provisional application No. 62/337,866, filed on May 17, 2016, provisional application No. 62/330,058, filed on Apr. 30, 2016.

(51) Int. Cl.
*G06F 21/00* (2013.01)
*G06F 21/36* (2013.01)

(52) U.S. Cl.
CPC .................................... *G06F 21/36* (2013.01)

(58) Field of Classification Search
CPC ....................................................... G06F 21/36
See application file for complete search history.

(56) References Cited

U.S. PATENT DOCUMENTS 9,519,768 B2* 12/2016 Birk ........................ G06F 21/32
9,613,353 B1* 4/2017 Quigley ............. G06Q 20/3821
2003/0204732 A1* 10/2003 Audebert ............ H04L 63/0846 713/182
2005/0273625 A1* 12/2005 Dayan ..................... G06F 21/31 713/184
2007/0234401 A1* 10/2007 Eldar ...................... H04L 12/12 726/2
2014/0310805 A1* 10/2014 Kandekar ............... G06F 21/36 726/19
2014/0325678 A1* 10/2014 Kotla ...................... G06F 21/62 726/28
2014/0359734 A1* 12/2014 Natividad ............. H04L 63/083 726/6
2015/0007088 A1* 1/2015 Itoh ....................... G06F 1/1643 715/773

(Continued)

*Primary Examiner* — Ghodrat Jamshidi
(74) *Attorney, Agent, or Firm* — Graham Casanova Alig; Alig Patent Law

(57) ABSTRACT

A method and apparatus is disclosed for password pattern recognition based authentication on a computer virtual screen, which hides passwords in plain view, visually camouflaged and disguised in a manner that makes them easily and quickly recognizable only to authorized password owners. The user is challenged to recognize multi-character password fragment patterns, and select them in proper order, from one or more visually challenging, constantly changing dynamic menus. The menus display fewer but larger user interface elements, for easier use on small screens, including thumb operation. The invention leverages innate human pattern recognition abilities which are superior to robotic, machine computational methods. Selection can involve methods such as gestures, touching, tapping, drawing connecting lines, and navigation of spring loaded menus. Selection can be also be accomplished by biometric measurement of unconscious user recognition. Selection interaction related biometric data can be part of the authentication verification data, increasing security.

17 Claims, 23 Drawing Sheets

(56) References Cited

U.S. PATENT DOCUMENTS

| | | | | |
|---|---|---|---|---|
| 2015/0143509 | A1* | 5/2015 | Selander | G06F 21/36<br>726/18 |
| 2015/0324113 | A1* | 11/2015 | Kapp | G06F 3/04883<br>715/863 |
| 2016/0065559 | A1* | 3/2016 | Archer | H04L 63/083<br>726/8 |
| 2016/0328094 | A1* | 11/2016 | Hwang | G06F 21/36 |
| 2017/0177851 | A1* | 6/2017 | Sawant | G06F 21/36 |
| 2018/0260555 | A1* | 9/2018 | Hardee | G06F 21/36 |

* cited by examiner

PASSWORD PATTERN RECOGNITION AUTHENTICATION METHOD

CROSS REFERENCE TO RELATED APPLICATIONS

This application claims priority to U.S. provisional applications

62/330,058 filed Apr. 30, 2016,
62/337,866 filed May 17, 2016,
62/343,129 filed May 31, 2016,
62/358,562 filed Jul. 5, 2016 the entire contents of which are incorporated herein by reference.

TECHNICAL FIELD

This invention pertains to computer authentication methods such as passcodes, passwords, passphrases, and user id entry methods involving computer virtual display user interfaces such as keyboards, text entry, or widget menus; also, mobile computer screens or displays, particularly those with small screens.

This invention also pertains to the entry of text on computer screens having a virtual keyboard and limited screen space, for example as would be found on a mobile handheld computer, tablet, smartphone, automobile dashboard, smart watch, virtual reality displays (projector eyewear, headgear, helmets, glasses/goggles such as Google Glass, military heads up displays (HUD), game consoles like the Nintendo Wii, Microsoft Kinect, etc.), and The invention also pertains to non-physical virtual displays, for example that project images directly into the eye via glasses, contact lenses, goggles or other devices; this can include images perceived by direct stimulation of the optic nerve or the brain's optical processing neural circuitry.

The invention also pertains to touch screen virtual keyboards, keyboard layouts and spring loaded menu systems.

The invention also pertains to biometric scanning devices, and subliminal, cognitive recognition involving one or more of facial expression scanning, eye movement tracking including Saccades), iris or pupil scanning, emotion and behavior recognition, neural scanners, brain wave scanners, and biometric physiological scanners, etc.

BACKGROUND OF THE INVENTION

Modern computer systems normally require authentication procedures, where users must first prove their identity and credentials before being given access. There are myriad levels and methods of authentication involving widely varying degrees of sophistication and levels of security. Some of the most common basic methods involve text based entry of both a unique user id and secret passcode, password, or passphrase, which can also involve drawing of a pattern on a screen, and various biometrics.

PIN numbers used to authorize credit or debit card financial transactions and are another example of authentication involving a secret code entered by a user. Such PIN numbers are generally used when making routine POS (point of sale) retail store purchases or ATM cash withdrawals.

Common biometrics involve scans of fingerprints, hand geometry, facial features, iris or retinal patterns, pupil size and shape, electro-physiological signals like EEG, ECG, neural pattern scanners, nerve impulse detectors, etc.

Authentication procedures may involve various combinations of any of these methods.

In this context, the terms "password", "passcode" and "PIN" are normally considered equivalent and are used interchangeably, unless qualified by context.

However all authentication methods involve various, often significant tradeoffs between levels of convenience, ease of use and degrees of security. But as the computer, particularly mobile devices proliferate and become integral to modern life, so does the need for more advanced security; but as virtual screens continue to shrink, highly secure long and complex password based authentication becomes ever more difficult to use.

Biometrics like fingerprints are popular, but can be difficult to keep secret and some can be spoofed (faked) relatively easily; a big drawback is that they can't be changed once compromised; for example each person has only 10 fingerprints, 2 eyes, and one set of DNA, etc. Biometrics can also be obtained without consent, for example by physical or legal coercion. Fingerprints, for example, are relatively easy to obtain directly from a person's hand or a surface touched by a person. By contrast passwords can be easily changed at any time.

Touch screen patterns are another common simple authentication method on virtual screens typical of small mobile computer devices. Typically a pointer device like a finger is used to draw lines connecting a series of dots on the screen, tracing a predetermined connective path pattern. A 3 by 3 grid of dots is a common implementation of this concept. But the complexity of the pattern is limited, and the method may be difficult to use accurately on small virtual screens or displays. Another drawback is that frequently used patterns can often become easily visible as smudge marks on virtual screens, a significant security risk.

Picture based passwords are another common authentication method, which require the user to associate a series of gestures with specific locations in a familiar image, creating a unique pattern called a picture PIN (personal identification number). Gestures can include things like the drawing of a line, a shape, or a tap. Microsoft Picture Password, originating in Windows 8, 10, is a good example of a picture based password. Such systems offer reasonably good and convenient security, but remain vulnerable because the images and related location gestures are static, thus can potentially be surreptitiously captured and copied in multiple ways. Another issue is that the system may be tricky to use on small screens, particularly with more complex images.

Passwords are one of the most common of these basic authentication methods, where a user is required to create and memorize a secret, difficult to guess sequence of alphanumeric characters and/or pictographic symbols. Passwords are typically used in combination with a unique user id, both of which are typically entered by a keyboard device, where each discreet password character is individually typed, in sequential order from start to finish, on a standard keyboard, starting from the beginning password character and continuing in precise sequence order until the final character entered.

Passwords are convenient because most computer devices are equipped with physical or virtual keyboards, and typing requires very little processing, and the simple Unicode associated password values are easy to encrypt, transmit and validate across secure network protocols such as Https. Passwords are also generally fairly easy to enter on relatively large standard desktop physical keyboards and on the virtual keyboard displays of larger mobile devices like tablets and very large smartphones.

Passphrases are methods which involve a sequence of memorized words that must be entered by the user.

However, password systems can also have significant drawbacks—the most secure are longer, more complex and by design do not resemble actual words or other known patterns, qualities which make them difficult to guess, but also difficult to remember. For example on a conventional English language QWERTY keyboard there are almost 100 or more different possible ASCII characters to choose from for every single password character to be entered.

More secure passwords are also time consuming and tricky to accurately enter or type without errors, in part because password letters are typically hidden when entered, which can cause the user to lose their reference point. These problems are greatly compounded on very small virtual screens typical of mobile computers like smart watches and smartphones, etc. Password entry can be particularly challenging when using thumb typing methods common on small devices.

On small screen virtual keyboards the normally tiny keys are hard to see and accurately select, make typing slow, tedious, difficult, and highly error prone. There are simply too many keys in too little space (high information density) for efficient use. Virtual keyboards typical of touch screen mobile devices are challenging to use because they generally duplicate the design of larger physical desktop keyboards, not taking into account the different ergonomics of small screen virtual keyboards, particularly common hand held and on the go usage.

Passwords or patterns can be compromised (or spoofed) in relatively simple ways, for example, by key logger type viruses/malware or spyware software hidden on a user's device.

However, authentication involving recognition of a visual pattern or image can be a trivial task for a human, but quite challenging for software and hardware machine methods. CAPTCHA (Completely Automated Public Turing test to tell Computers and Humans Apart) for example is an effective method of distinguishing humans from robotic systems; it requires interactive user visual interpretation of obfuscated character imagery, which makes it much less vulnerable to standard key capture spyware type software viruses. CAPTCHA, however works best to verify that a human, and not a robot or machine is operating a computer. However, current CAPTCHA like password recognition methods can be unnecessarily difficult and inconvenient to use, particularly on small screens, since by design they require excessive numbers of challenging recognition steps, normally one for each individual password character or element.

BRIEF DESCRIPTION OF THE DRAWINGS

FIG. 3C shows a menu of password components (pfragments) arranged on a virtual screen in random locations, interspersed with invalid, fake decoy password like components.

SUMMARY OF THE INVENTION

In one embodiment of the invention, a method of authenticating the permitted use of a computer device comprises a user and the device conducting the following steps: Step one, the user possess a computer device comprising a microchip, a display and data that can only can accessed by the user after authentication that the user knows a password code which can be deconstructed into two or more pfragments which can only reconstruct the password code in a specific order whereby selection of the pfragments in the specific order demonstrates knowledge of the password code. Step two, the device presents the pfragments to the user on the display in a dynamically obfuscated method. Step three, the user selects two or more pfragments in a selected order from the presentation on the display. Step four, the device verifies the pfragments selected by the user and the order of the pfragment selection by the user is the pfragments of step 1 and the specific order of step 1 which demonstrate knowledge of the password code. Step five, the device permits access to the user to the data which can only can accessed by the user after authentication.

The inventive methods disclosed make complex, highly secure secret passwords, passcodes and user ids easier and less cumbersome to enter on computer devices, particularly on small virtual screens such as those found on handheld or wearable mobile devices or appliance control panels. The disclosed methods provide fewer, but larger, easier to use menu like user interface options, which are far easier to use than traditional keyboards on small, cramped or visually challenging displays.

The invention hides a password in plain view, but camouflaged and disguised in such a manner that only an authorized password owner can recognize it. Instead of trying to remember and recognize each individual password character or element, the user must instead identify and select longer multi-element password fragments or segments from one or more visually challenging, dynamic challenge menu displays. Such password segments also serve as hints or reminders, similar to how word completion menus function.

Figure 12A:
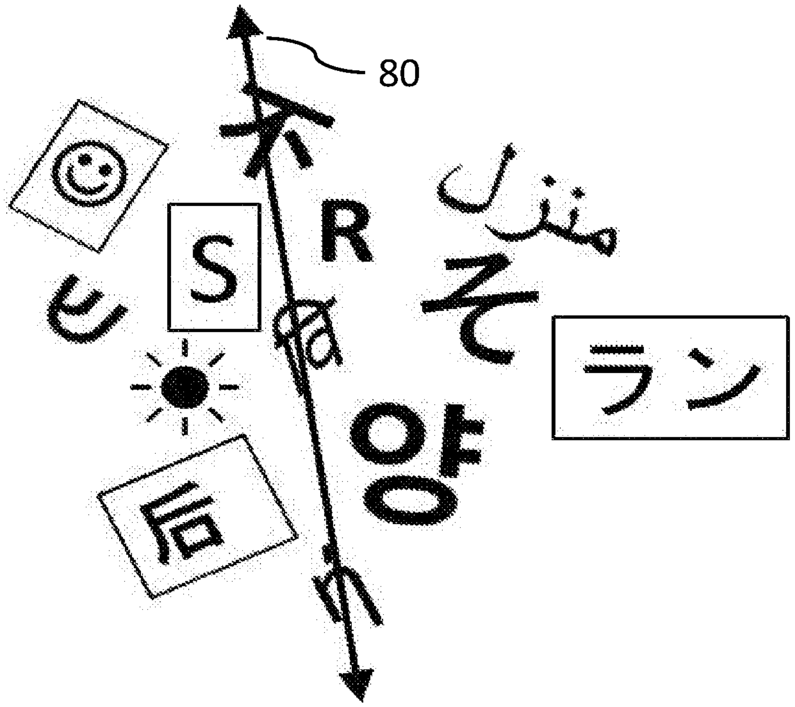
FIG. 12A shows how a straight line can connect pfragment or segment termini start and end elements of a hybrid language character password.

These methods apply equally to any secret id or passcode, in any language, required for secure authentication. These methods also apply to ids or codes which may consist of any combination of letters, symbols, characters, pictographs, pictograms, logographs, logograms, ideographs, ideograms, etc. from any combination of multiple languages. For example FIGS. 12A and 12B display a wide diversity of global language characters used in combination, including Roman Latin and Asian characters.

Such ids and codes can also include non-language custom graphical elements such as symbols, images, video clips, icons, emoticons, for example that lack official Unicode representation.

The entire challenge menu display, as well as any of its individual constituent graphical elements, can have independent display characteristics, such as colors and animations.

On English QWERTY keyboards, a user must remember up to 100 or more possible characters for every password letter required. In Asian languages like Chinese there could be thousands of possible characters. However, in normal typing word completion menus assist users In entering long and complex words by guessing which words are intended, but such aids are a security risk when entering ids or passwords. The invention however discloses a mechanism of partial password hints or fragment display and selection, which is highly secure since only easily and quickly recognizable to an authorized password owner.

Passwords and user ids are conventionally entered on an individual element or character by character basis using a fully populated, information dense keyboard, showing all possible keys, characters and symbols. By contrast, the inventive process displays minimal information, consisting mostly of discreet sequences of one or more characters and or images, representing one of more possible passwords or password segments.

Various methods are used to select and identify the displayed password or password segments from a dynamic, interactive challenge menu system. Thus authentication becomes similar to a word recognition puzzle, but where a user must find partial passwords.

Figure 1:
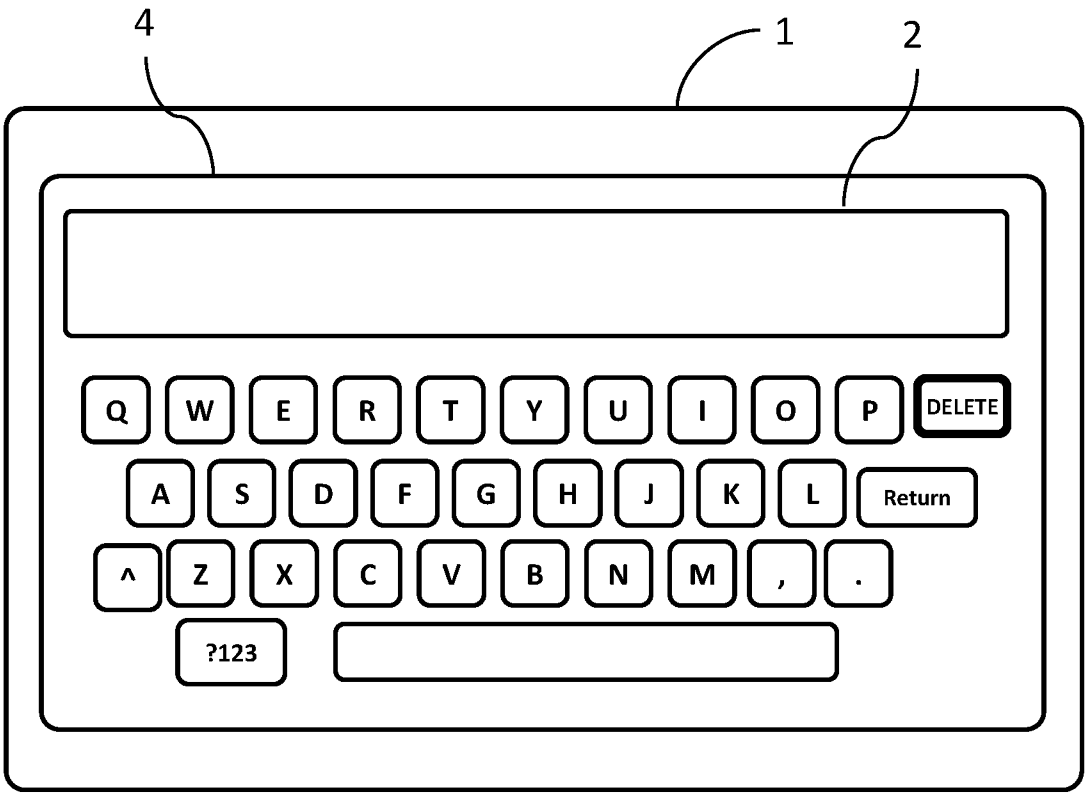
FIG. 1 shows a typical mobile device virtual keyboard editing apparatus, with an abbreviated Roman Latin character QWERTY keyboard.

FIG. 1 illustrates an abbreviated (not fully populated) conventional QWERTY style keyboard on a small device 1, with virtual display 4, where text entry field 2 is typically used to enter id or password characters.

A system of visual recognition also allows for more complex values than simple Unicode values typical of conventional passwords, because the Unicode values can be hidden and obscured inside of visually derived interaction and biometric data, creating greater security.

Rather than returning simple Unicode values corresponding to individual password characters, the user's system can calculate a value derived from pfragment-imgs, including screen locations and biometric data related to use of the touch screen. These derived values can change frequently since the actual password components or segments can be randomly chosen, as well as the their screen locations.

Thus instead of just passing a static sequence of static Unicode values, the invention permits far more variable, hidden, and complex set of verification data to be transmitted, making the basic password far more secure. So instead of just a simple password, complex password derived data is generated and transmitted, adding a layer of indirection which cloaks the password and authentication process with additional significant security.

This added complexity improves security by making it more difficult for "man in the middle" and other types of security attacks to discern the actual password, particularly as attackers would have to know how to simulate the user's biometric recognition signature on every possible device and every possible permutation of pfragment combinations, pfragment-img characteristics and screen locations, much of which can be totally random. The system becomes even more secure over time as subtle variations in the user's password entry signatures are accumulated in databases.

Thus authentication can be much more than passing simple password/passcode Unicode values, since it can also include changing display, biometric, behavioral and interaction data. The same methods described here also apply equally to user ids and similar code related authentication entry procedures.

There are significant advantages over prior art: improved ease of use due to fewer keys on the screen, resulting in lower information density, making small screen interaction easier and more accurate. The approach makes long, complex, more secure passwords easier to remember, and quicker, easier and more convenient to enter, particularly on smaller mobile screens. The password doesn't automatically change each time, but the representation of the password does, thus greatly increasing security.

In contrast to conventional picture based passwords, the invention presents the user with partially hidden, disguised, obfuscated images, displayed in constantly dynamically varying patterns, locations, and even animations, which makes compromising the system much more difficult. In addition, the invention can work equally well on widely varying size devices, and adapts particularly well to very small screens.

DETAILED DESCRIPTION OF THE INVENTION

Terminology Definitions

In this context the terms "password" and "passcode" are normally considered synonymous and interchangeable unless otherwise noted.

The terms "password fragment" (or just "pfragment") and "password segment" (or just "psegment") are also synonymous and used interchangeably.

Pfragments or psegments are defined as any subset group of one or more discreet, contiguous, atomic password elements, where each pfragment retains the original password element group sequence order and start and end position (or location) within the password or just "position" or "location metadata").

For example "AB" and "C" are valid pfragments of password "ABC", whereas "BA" and "AC" are password element subset groups, but invalid pfragments, since not retaining the original element sequence ordering.

The strictly visual representation of a pfragment or psegment is called a password fragment (or psegment) image, or just "pfragment-img" or "psegment-img", which depending on context, may be used interchangeably with the terms pfragment or psegment.

Description Detail

Typical standard keyboards like QWERTY statically display approximately (depending on the language) 26 alphabetical keys, 10 numeric keys, plus numerous control and special symbol keys, making such keyboards tricky, error prone and unwieldly to use on cramped, small virtual screens. However, passwords require far fewer characters, thus the majority of keyboard space is wasted during typical password entry. Another more general problem is also that standard relatively rectangular keyboard shapes may not easily fit the round or oval shapes of small virtual screens, for example wrist worn devices, or devices embedded in clothing, etc. In addition, standard keyboard shapes and high information density is often not ideal for the ergonomic requirements of hand held mobile devices, for example single hand thumb typing.

Remembering an optimally secure password is difficult for most people, since the most secure are long, complex, nonsensical, and are intended to exclude recognizable patterns like words or names. Such passwords are also cumbersome to type. However, cognitive research shows that it's far easier for us to recognize and remember shorter chunk like sequences of data, rather than an entire long and complex sequence of characters and/or symbols. It's also easier for our minds to quickly recognize the inherent visual pattern or image of a sequence than to remember the discrete individual components; for example, cognitive research demonstrates that reading actually involves image pattern recognition of entire words, even phrases, rather than the processing of individual letters. Our innate recognition systems are also very good at quickly discerning such patterns even when displayed in myriad, considerably varying graphical forms, which may involve varying size, shape, shades, colors, filters, watermarks, 2D or 3D rotations, and topological shape distortions involving curvature or twists, etc.

Research also indicates that recognition can be detected by physiological cues like unconscious eye movements (Saccades), pupil reactions, or nerve impulses or neural pathway trigger indicators or scanners—many such detection methods are becoming commonplace in standard mobile devices like smartphones, smartwatches and wearable fitness monitoring gear.

Just like actual words, shorter component sequences of long passwords represent visual patterns that we recognize even if we struggle to recall the specific individual constituent characters or elements. For example, the pictograms or pictographs of Chinese characters are easily recognized patterns, even though the individual details of each may be tricky to recall. Thus it's generally far easier to recognize a familiar macro pattern than to describe the fine detail, especially one we haven't seen in a while.

Also, because passphrases normally involve a sequence of words, each constituent word can be fairly easily recognized.

Password Fragments (Pfragments)

In this context a password or passcode may consist of any combination of Unicode and non-Unicode alphanumeric characters (or character images) of any language, including Roman Latin characters, Asian language characters, pictographs, pictograms, logograms, logographs, ideographs, ideograms, icons, gifs, graphical symbols, Emoticons, or images. Examples of Asian language characters include a. Japanese: Kanji, Katakana, Shinjitai, Hanja b. Chinese: Hanzi, Hanji, Pinyin, and jianhuazi simplified characters c. Korean: Hanja, Hangul d. Philippines: Bopomofo e. Thai: Tai-Kadai language characters Additionally, passwords in this context may also include character images, or custom, modified versions of characters or character images of any language.

To further thwart attackers each displayed password component or segment can have individual display characteristics, such as colors and animations. Any and all graphical elements of the password challenge menu display can simultaneously, individually animate, while at the same time the entire challenge menu display area itself can also animate. Such animations can involve changing 2D or 3D axis rotations, along with simultaneous shape shifting changes and distortions.

For example an individual password character or element could rotate in a 2D clockwise fashion at a given speed, where colors, rotation speed and angle can vary over time.

Any password element can also have associated graphical display metadata or properties, for example colors, 2D or 3D shape distortion attributes or animation properties.

The term “symbol”, “element” or “character” in this context refers generally to any such individual password component or element. Digital images or other password components can include images from social media and other digital “footprints”, which would be hard to guess or accurately interpret for anyone but the actual user. Digital Footprints (or just “footprints”) may involve any size imagery, but typically means very small “thumbnail” size images.

In this context, a password element (or just “element”) refers generally to any individual, irreducible (atomic) password component of any of the aforementioned types.

In the inventive process, passwords are obfuscated by initially dynamically breaking them into random groups of one or more element sequences, called password fragments/segments (or just “pfragments”, or “psegments”).

A pfragment is defined as any subset group of one or more discreet, contiguous password elements, where each pfragment retains the original password element group sequence order and also the element group’s start and end position (or location) within the password (or just position or location “metadata”).

Any password can be represented by a set (or group) of 1 or more related sibling pfragments of varying length, where all set members derive from a common shared parent password, and where each set collectively represents all elements of its parent password. Each set’s pfragment members can be concatenated together, each in its original parent password location sequence order, to reproduce the original parent password.

Any password can be represented by multiple (one or more) pfragment sets, where sets sharing 1 or more pfragments are overlapping. For example password “A1bC” can be represented by the following group of pfragment sets:

a. Set 1: “A”, “1bC”
b. Set 2: “A”, 1", “bC”
c. Set 3: “A1”, “bC”

Sets 1 and 2 overlap as they share their common “A” pfragment.

“Zt39#p]B!8” is an example of a Roman Latin alphanumeric password, referred to as “Latin1”, which is difficult to guess as it consists of a highly variable, highly random mix of upper and lower case letters, numbers and symbols, containing no recognizable patterns in any language. Yet these same strong security features also make this password difficult to remember for most people, and also challenging to type, particularly on small screens.

Figure 2A:
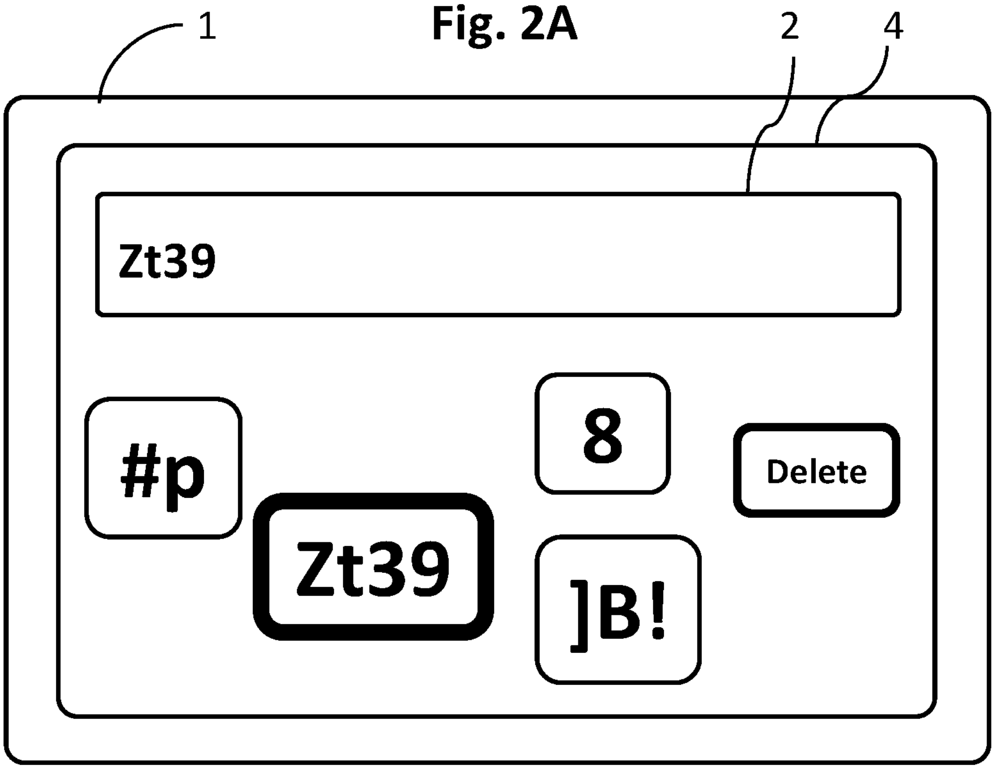
FIGS. 2A, 2B, 2C, 2D shows component pieces of a password (pfragments or psegments), positioned in random locations on a virtual display, and where each pfragment is selected for incremental input into a password entry field.
Figure 2B:
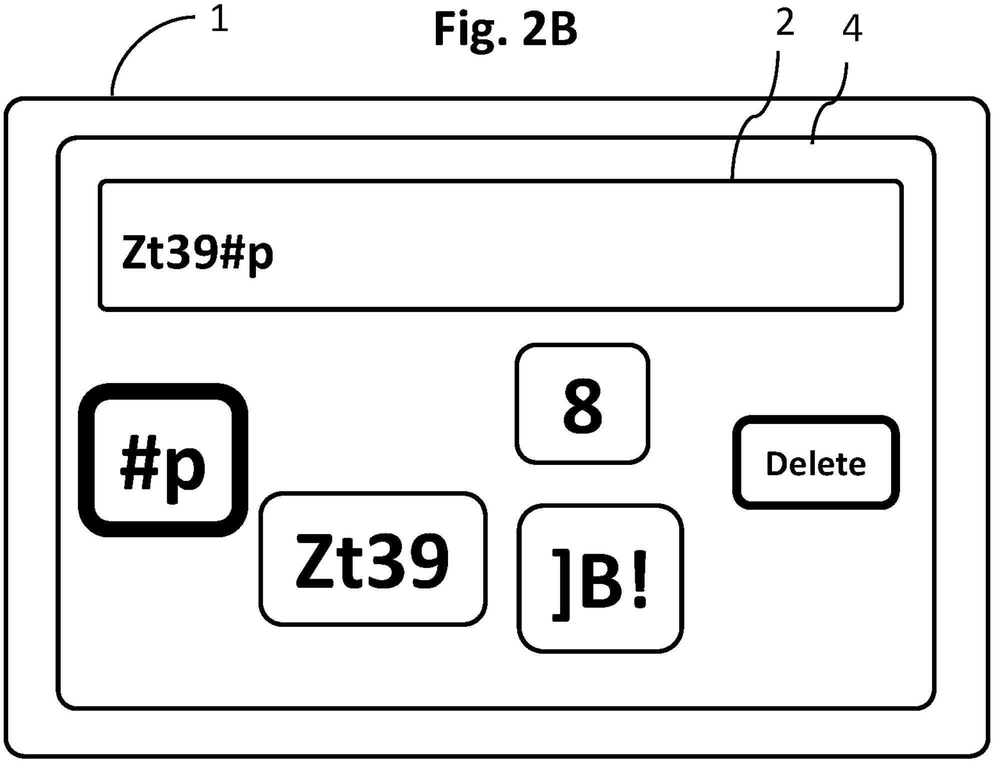

Latin1 can be broken up into this example pfragment sequence group, referred to as “Latin1-group1”: “Zt39”, “#p”, “]B!”, “8”, shown in FIG. 2A.

Figure 5A:
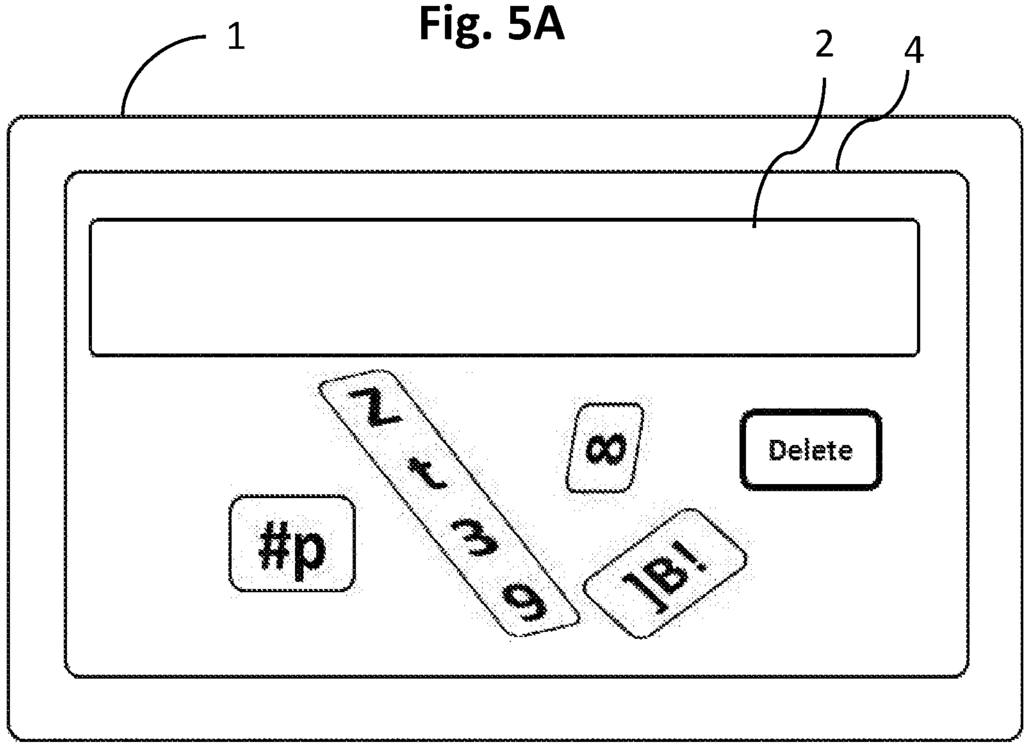
FIG. 5A shows password components (pfragments) displayed with borders and various 3D rotations, randomly positioned on a virtual display menu.
Figure 5B:
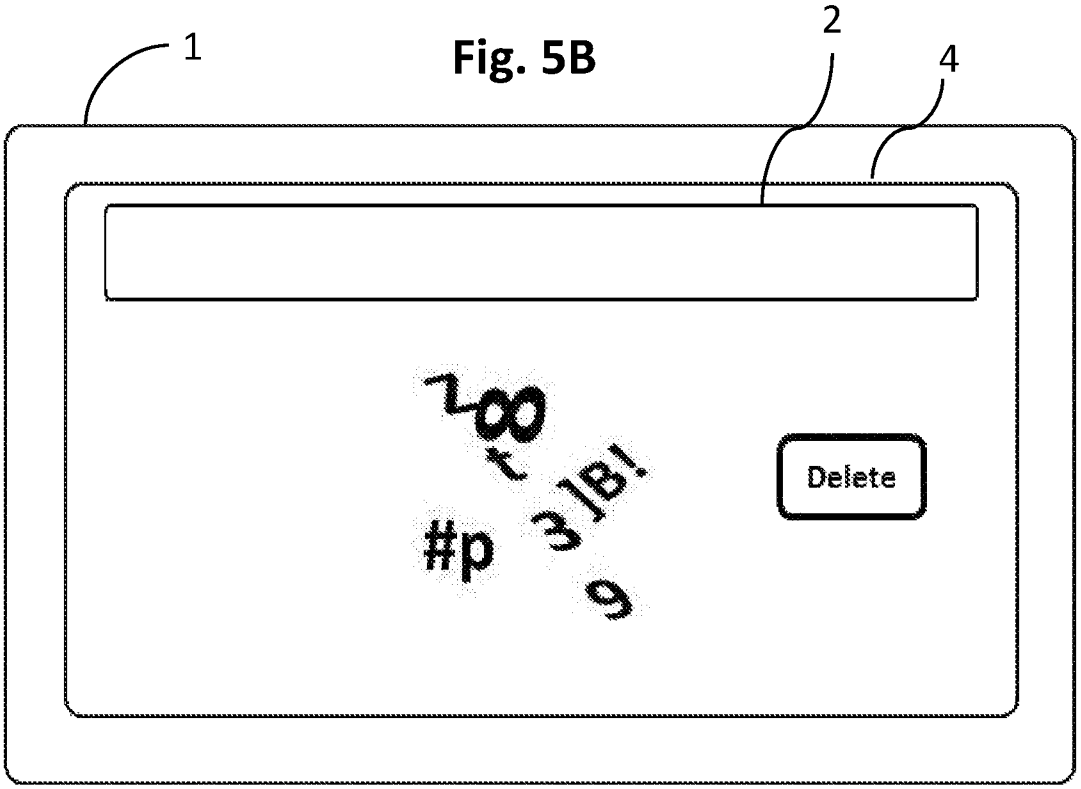
FIG. 5B shows password component element groups (pfragments) with various distorting 3D rotations, with the components arranged in a contiguous manner.
Figure 5C:
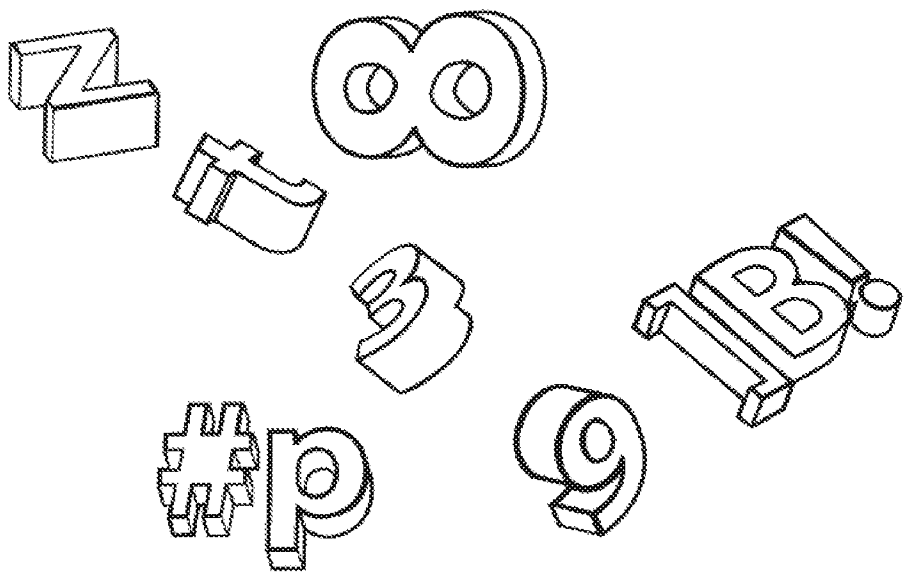
FIG. 5C shows 3 dimensional versions of password components (pfragments), displayed with various 3D rotations, with the components arranged in a contiguous manner.
Figure 5D:
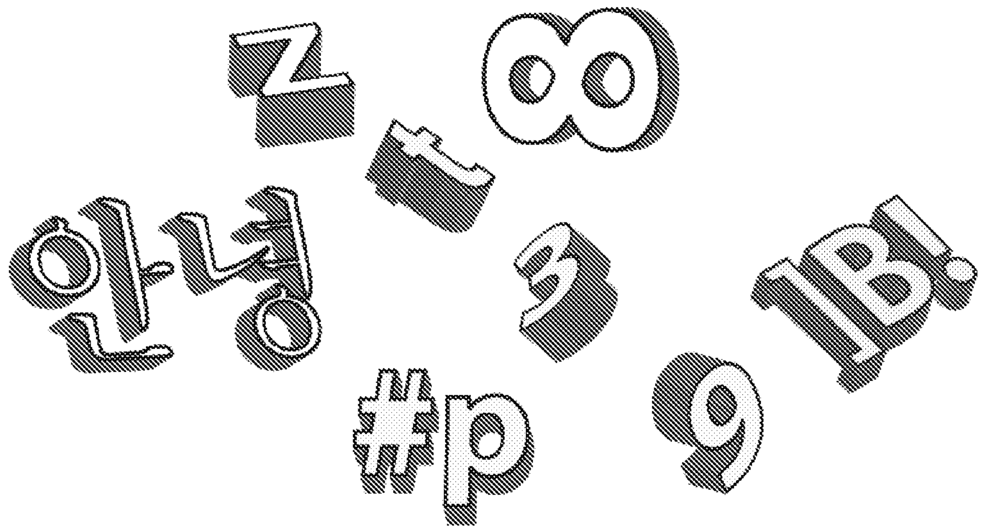
FIG. 5D shows 3 dimensional versions of password components (pfragments), including an Asian language character, displayed with various 3D rotations, with the components arranged in a contiguous manner.

FIG. 5D shows an example of an Asian character used in combination with Latin1-group1.

Figure 10:
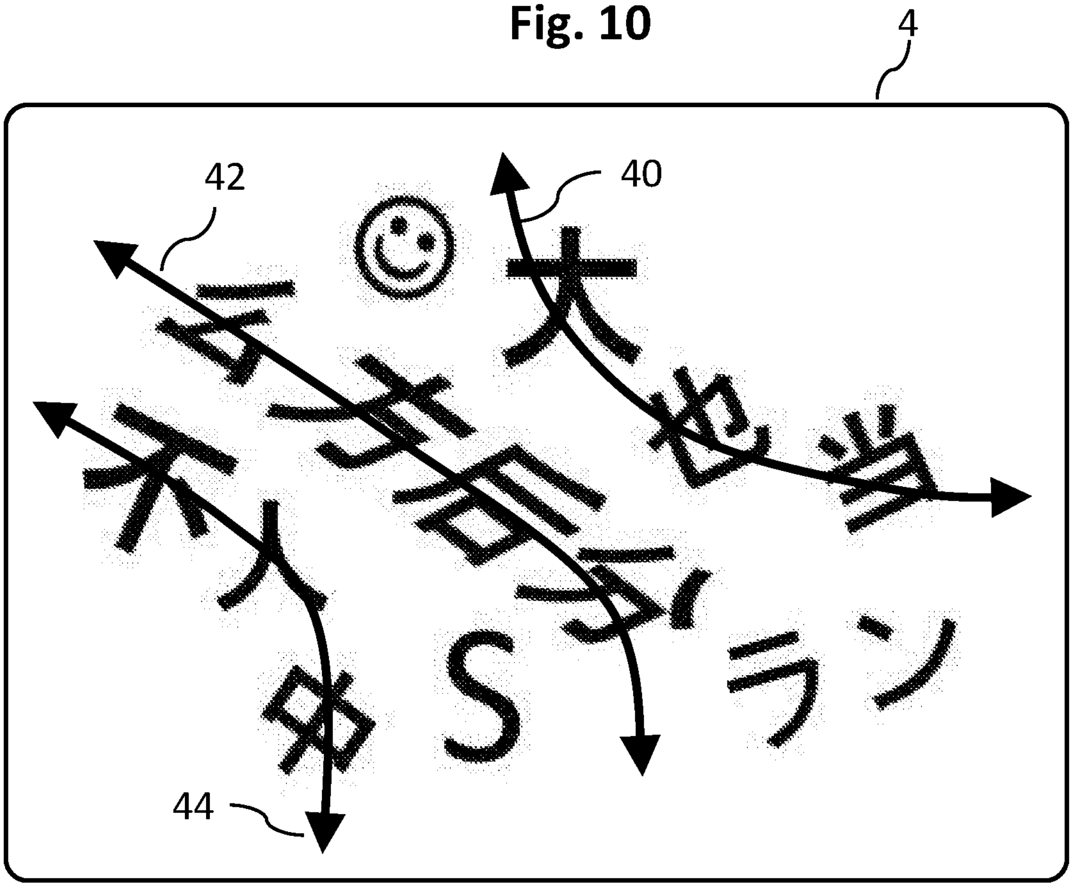
FIG. 10 shows the pfragment components of a Chinese character password arranged in contiguous and visually challenging layouts, with valid segments identified by lines connecting elements and characters.

不人中大也当么方 后分 is an example of a simplified Chinese (jiǎnhuázi) character password, referred to as “Chinese1”, which can be broken up into this example pfragment group:

a. “不人中”, “大也当”, “么方后分”

shown in FIG. 10, where multi-directional arrow lines 40, 42, 44 connect the elements of each pfragment, serving to identify valid pfragments.

不Rवि앙ή そשل منز ☀ is an example of a hybrid password, referred to a.

“Hybrid1”, consisting of a composite mixture of myriad language characters, and also purely graphical symbols, including in respective order characters from simplified Chinese, Roman Latin, Hindi, Korean, Greek, Japanese, Arabic, Hebrew, and purely graphic symbols. Hybrid1 can be broken into this example group of pfragments, referred to as “Hybrid1-group1”:

a. “不Rवि앙ή”, “そمنزل”, “ש ☀”

Hybrid1-group1 pfragments are Illustrated in FIGS. 11A, 11B, 12A, 12B, 13A, 13B, 13C.

Figure 6A:
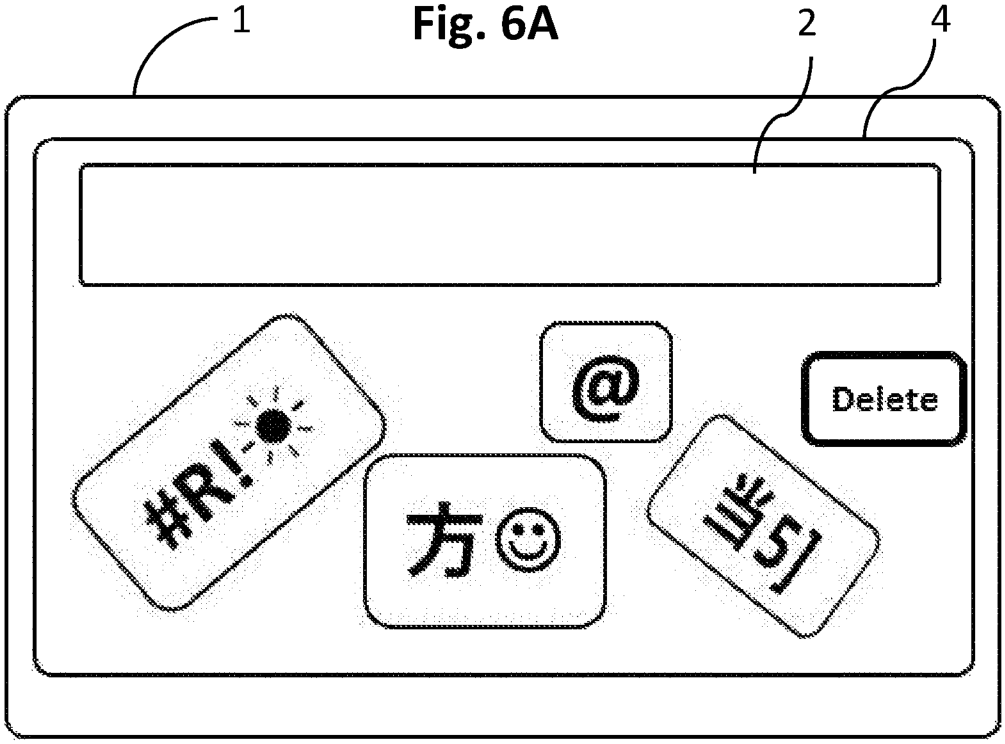
FIGS. 6A, 6B shows segments of a hybrid language character and graphic symbol password, displayed using overlapping and non-overlapping positioning on a virtual display.
Figure 6B:
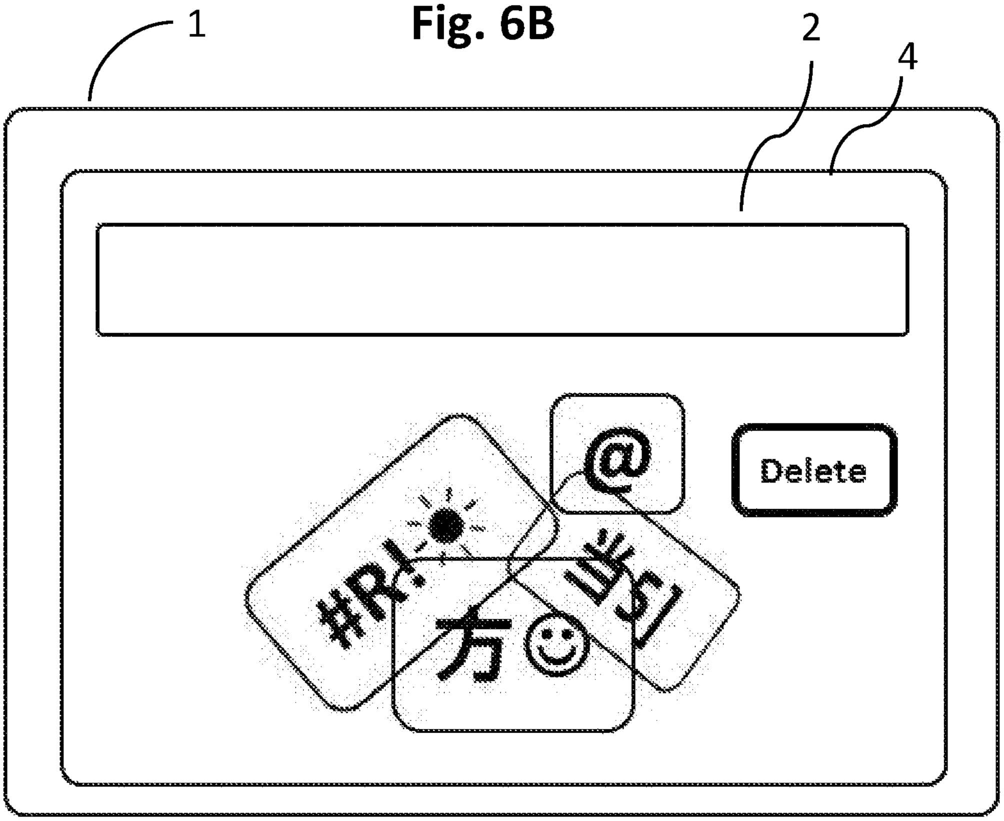
Figure 15:
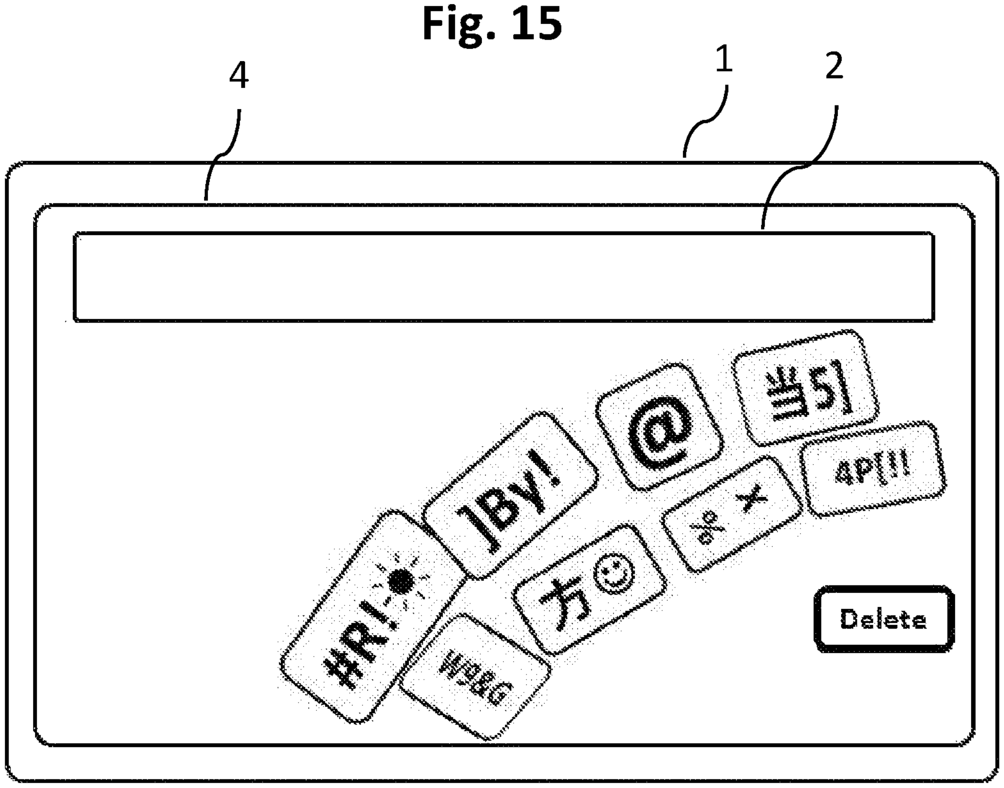
FIG. 15 illustrates a mixed menu of valid and fake password components pfragments) arranged in a curving layout, ergonomically optimized for easier thumb usage, particularly on small mobile screens.

“当5 ▯ #R!☀ 方 ☺ @” referred to as “Hybrid2” is an example of a hybrid password consisting of Roman Latin characters and symbols, simplified Chinese characters, emoticons (smiley face ☺ ) and graphic symbols. It can be broken up into this example pfragment set, referred to as “Hybrid2-group1”:

“当5]”, “#R!☀”, “方 ☺”, “@”

which is shown in FIGS. 6A, 6B, 15.

Pfragment Camouflaging Display Methods

The invention dynamically obfuscates passwords by first generating random pfragments, then creating visually distorted pfragment images, which are further camouflaged by random screen location placement, and optionally surrounded by fake decoy pfragments and other deliberately confusing visual “noise”. An authorized user can still recognize such a visually distorted password display, however the obfuscations make it extremely difficult for others to recognize, including robotic machine snooping or eavesdropping.

Figure 7:
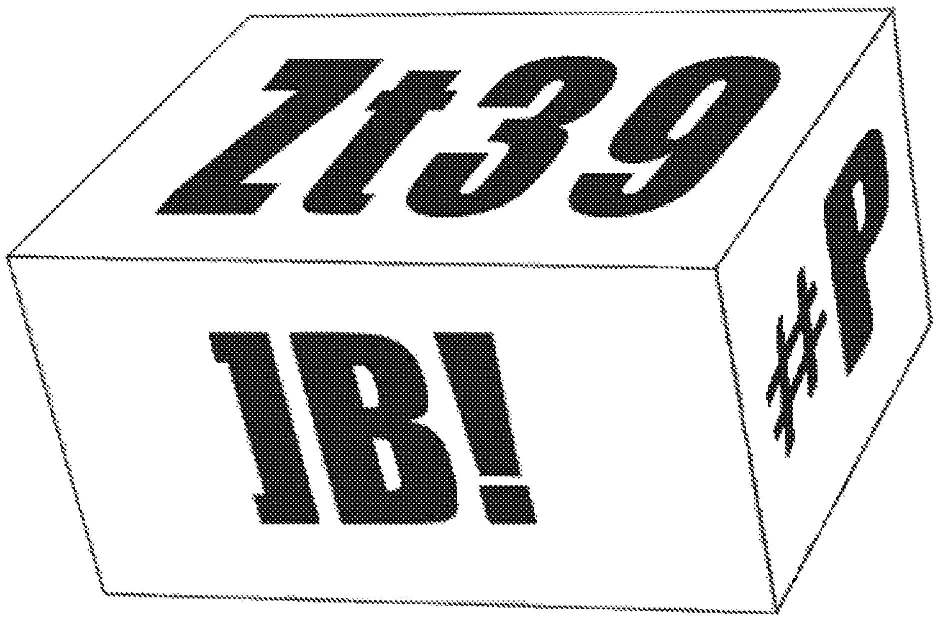
FIG. 7 shows password segments displayed on the surfaces of a 3D object.

A visually distorted digital image of each pfragment (or just “pfragment-img”), is dynamically generated by use of irregular and visually challenging graphical patterns and properties, including font type, size, orientation, shape, border, colors, etc, which are also applicable to individual pfragment member elements. Additionally pfragment-imgs may be displayed in any combination of 2D or 3D angles of rotation, perspective, curvature, shape, and topological distortions such as pretzel like twists. Pfragment-imgs may also be displayed mapped on to the surfaces of 2D and 3D objects, seen in FIG. 7.

In an embodiment, one of more pfragments can be displayed in a reverse or jumbled, non-sequential order as cognitive research demonstrates that it’s possible to recognize the original order, especially given adequate contextual clues, such as the presence of the larger group of related pfragments. For example, “Zt39” of latin1-group1 could be displayed in reverse order as “93tZ”.

For example FIGS. 5A, 5B shows Latin1-group1 in various combinations of 3D rotation angles, still easily recognizable to humans, but difficult for robotic software to recognize. FIG. 5C illustrates a similar Latin1-group1 layout using 3D letters.

Pfragment-imgs are shown in dynamic random locations on a virtual screen or display, deliberately making the correct order unclear, challenging the user to specify not only which are valid pfragments, but optionally also their correct password sequence order.

Depending on available screen space, pfragment-imgs may be mixed in with other fake decoy pfragment like images, unrelated to any of the user’s valid passwords, essentially visual “noise” designed to confuse, obfuscate and disguise which are valid pfragments, for example seen in FIGS. 4A, 4B, 4C, 4D, 6C, 10, 11, 12, 13. This improves security by making both unauthorized human and machine robotic recognition much more difficult.

Pfragment-img display locations may be in 2D or 3D coordinate space, and the user's view and navigation can involve virtual reality (VR) display devices.

Display Strategies to Obfuscate Pfragments

In an embodiment both related and fake decoy pfragment-imgs and their constituent elements are positioned in a relatively contiguous and close proximity manner to each other, which introduces visual ambiguity as to where any pfragment starts and ends, adding significant difficulty to unauthorized visual or robotic machine recognition; this ambiguity is enhanced when contiguous display is combined with visual distortions like 2D and 3D rotations. This contiguous placement strategy exponentially increases the number of potential pfragments on the display that have to be robotically evaluated, which greatly enhances security, but while not impeding recognition by an authorized password owner.

For example, FIGS. 5B, 5C, 5D shows pfragment Latin1-group1 where pfragment "Zt39" appears to intersect with pfragment "]B!", suggesting a possible "3]B!" pfragment. However only someone who knows the correct password(s) could quickly recognize "3]B!" as an invalid pfragment.

FIGS. 5B-5D illustrate the intersection of pfragment "Zt39" with pfragment "8", visually suggesting possible pfragments "Z8t39", "8t39", "Z8", none of which are valid. As the number of pfragments, both valid and invalid visually intersect, the number of possible pfragments increases astronomically, creating huge computing problems for unauthorized, eavesdropping machine recognition trying to guess a user's password.

FIGS. 2A, 2B, 2C, 2D shows Latin1-group1 pfragments being selected in left to right order, where each selected pfragment-img is shown with a bolded outline, and the value is concatenated to the end of all previously entered pfragments in password text entry box 2.

Figure 3A:
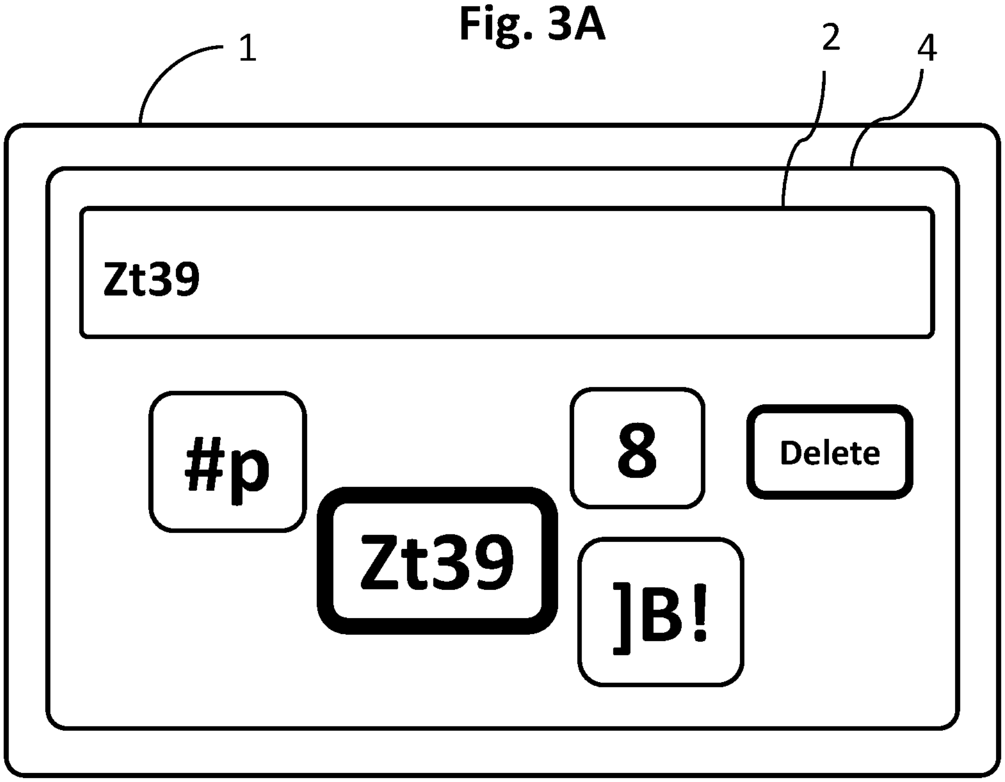
FIGS. 3A, 3C, 3B illustrates how selection of each valid password fragment component (pfragment) causes the component to be hidden after selection, allowing remaining components to increase in size.
Figure 3B:
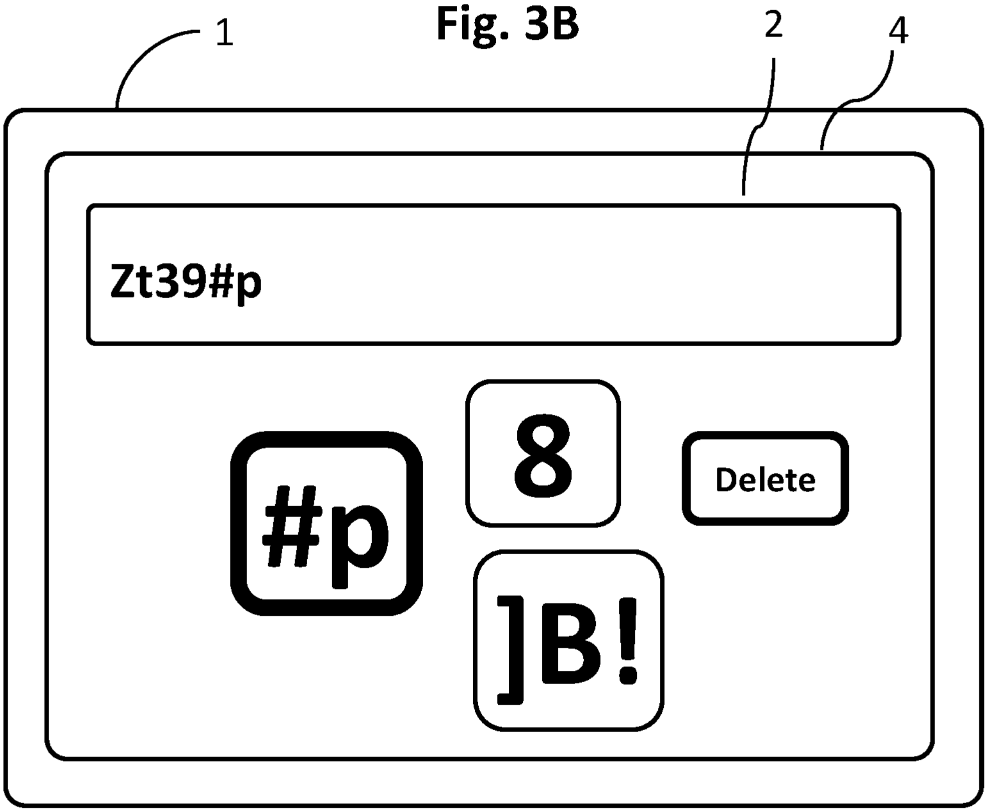
Figure 3C:
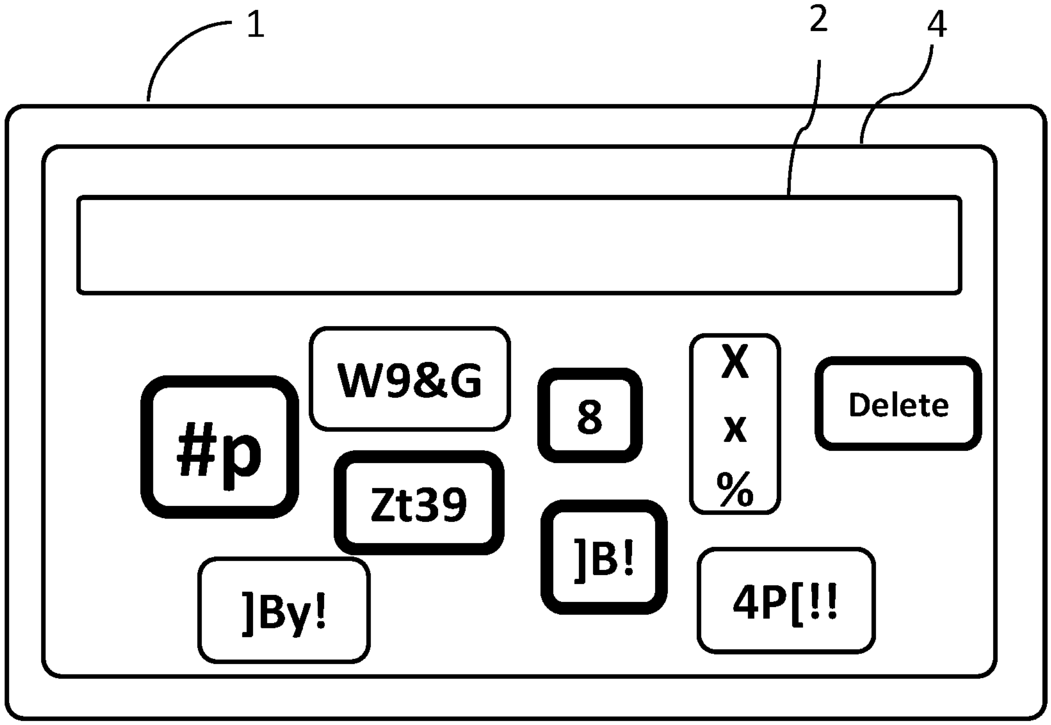

In another embodiment, each pfragment-img selected in proper order is hidden, allowing remaining pfragment-imgs to dynamically increase in size using the extra space, and where larger sizes improves visibility and ease of use. This process is illustrated in FIGS. 3A, 3B, where the "Zt39" pfragment is hidden after selection, followed next by the remaining pfragment-imgs displayed in larger sizes.

Partially Obscured Password Elements

Figure 9:
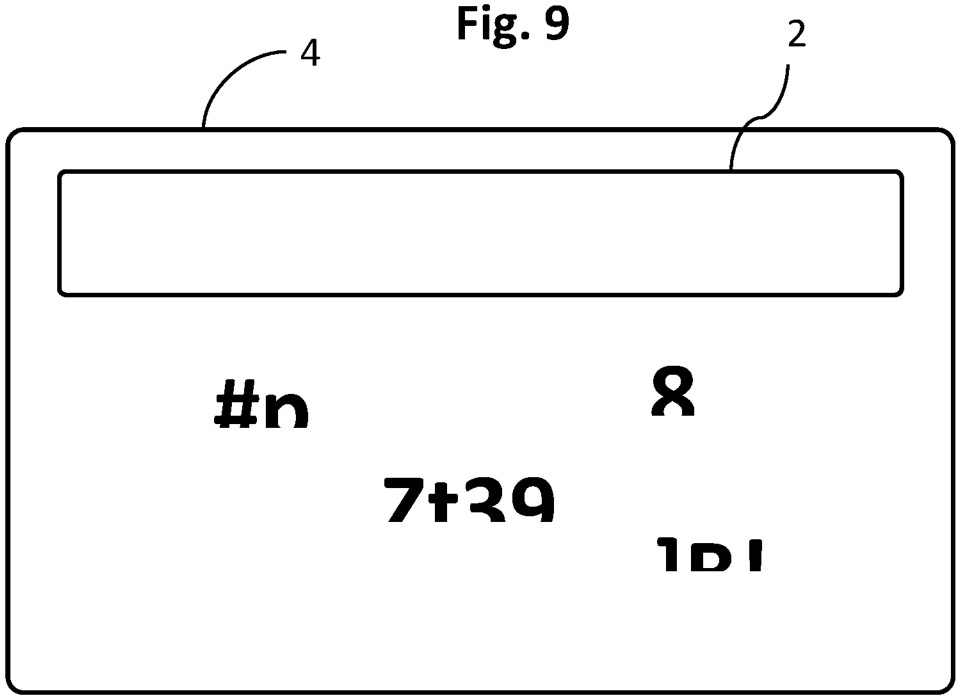
FIG. 9 shows password components (pfragments) arranged on a virtual display with the bottom region of the characters hidden.

Cognitive research also shows that we can also easily recognize familiar but partially obscured words and phrases, particularly in the proper context, by unconsciously filling in missing or hidden regions based on recognition of the overall contextual pattern. Thus pfragment-imgs may be partially obscured in order to create additional challenges for robotic machine recognition, but while remaining easily recognizable to authorized password owners. Pfragment-imgs may be displayed with up to one half or more of their top or bottom regions partially or totally obscured or hidden. For example FIG. 9 shows the partially hidden pfragments of Latin1-group1. The context of the entire pfragment sequence, just like the words of a common phrase, makes it much easier for the mind to fill in missing information and therefore to recognize such obscured pfragments.

In another embodiment pfragment-imgs may partially overlay each other or decoy images, adding further challenges to robotic machine recognition, with examples shown in FIG. 5B and FIG. 6B. In such situations, various gestures, such as pressing harder or leaving a pointer in place (hovering) can allow underlying, overlaid pfragment-imgs to be selected.

In still another embodiment, pfragments may be slightly misspelled; the reason is that research indicates that the human mind can still recognized and understand misspelled words, particularly when in a the normal context of a familiar phrase or common usage.

Animation

In an embodiment, optionally any or all discrete visual elements, including password elements or segments, and visual noise, decoys, etc. can animate in 2D or 3D orientations. The entire challenge visual display group can move, change shape, and animate for example in a 2D rotation. All the elements in the display area can also animate; thus for example password segments can move in snake like fashion, while changing position. However, once the user initiates a trace drawing operation, pfragment animations are temporarily paused. Such movement and animation is designed to create additional barriers for attackers, but while remaining easily usable for humans. Such animation scenarios can resemble video games as the user must not only find and recognize password elements or segments, but must also track their motion in order to accurately touch or select the desired challenge display locations.

In an embodiment the user is required to correctly recognize an animation showing valid pfragments or rotating the correct pfragment-imgs into full frontal view in their correct start to end sequence order. Sequence order can vary depending on language, but the most common order starts from the left and goes right (left to right).

Another type of animation may involve a filter which changes any combination of colors, lighting, shading or visual noise background. For example an animated filter can move an opaque sheet with a grid of small non-opaque openings (or windows) over the pfragments so that only small portions of the pfragments are visible at any given moment, where the movement motion may be smooth and continuous or random and erratic in speed and direction. In a variation, the sheet may be fully or partially opaque and the degree of opaqueness can vary. The shape and location of the window openings may also change.

In another embodiment, authentication may resemble a virtual reality game play interaction, where a correct sequence of actions and recognition responses serves as a unique identifying signature or "password". For example the user may be required to navigate a virtual reality scene in a specific path from a beginning to and ending location, involving various interactions along the path, which may include recognition events; for example, the user may be required to recognize pfragments embedded in the scenery or even recognize specific items such as a painting, or a view, or even a simulated virtual favorite pet or family member, or a scene from a past event involving family or friends.

Variable Digital Footprint Password Elements

For optimal security passwords should ideally change in a completely random manner after every usage.

However this is rarely practical or convenient. The inventive methods introduce constant incremental password changes based on a user's recent digital footprint hints Many elements the user must recognize or identify in the inventive authentication process can derive directly from a user's social media and other "digital footprints" or past history. Examples include mobile "app" activity, recently read digital content (books, articles, social media, etc.) recent social media postings by the user or their connections, including pictures, videos and commentary or remarks and reactions ("like", "love", etc.).

For example the user might be required to identify a series of book cover images of recently read books in a correct reading timeline sequence. Or the user might be required to draw a line connecting clues to some of their recent social media posts, in a correct timeline sequence order, where clues may be recent picture postings.

The inventive method creates constant incremental password change by inserting a user's digital footprint "hints" (or just "footprints") in the password, where a footprint can consist of a composite sequence of 1 or more individual footprints, for example a short sequence of small "thumbnail" size digital images representing recent social media posts, for example images the user has posted, viewed, shared, or reacted to.

This process can involve temporarily inserting recent footprints, either in between existing password elements, or by temporarily replacing some elements, or some combination of both. This method automatically introduces great variability into normally static passwords—such variability greatly increases security because to be properly understood, an attacker would require an extremely broad knowledge of a user's overall recent digital activities, for example recent mobile app usage, web searches, ecommerce, messaging and social media activity.

Such footprint based passwords are a particularly good fit for social media sites, as the sites automatically share secret non-public knowledge of significant aspects of a user's recent digital footprint activity.

For example in the Hybrid2 password example, "当5? #R !☀ 方 ☺ @", the "方 " character or element might be substituted by one or more small thumbnail images from social media the user has recently viewed, shared, posted, commented on or reacted to. Examples could include a recent picture of a favorite pet, or a recent event like a birthday party. In such a scenario, the user would include the valid images in connecting lines or in subliminal biometric recognition markers. To confuse attackers the authentication process can also display some invalid, fake digital footprint images.

Small, icon size pictures can be hard to uniquely identify, particularly on smaller displays, thus digital footprint pictures or photos are best suited to larger displays, or best used in larger size formats.

Figure 18:
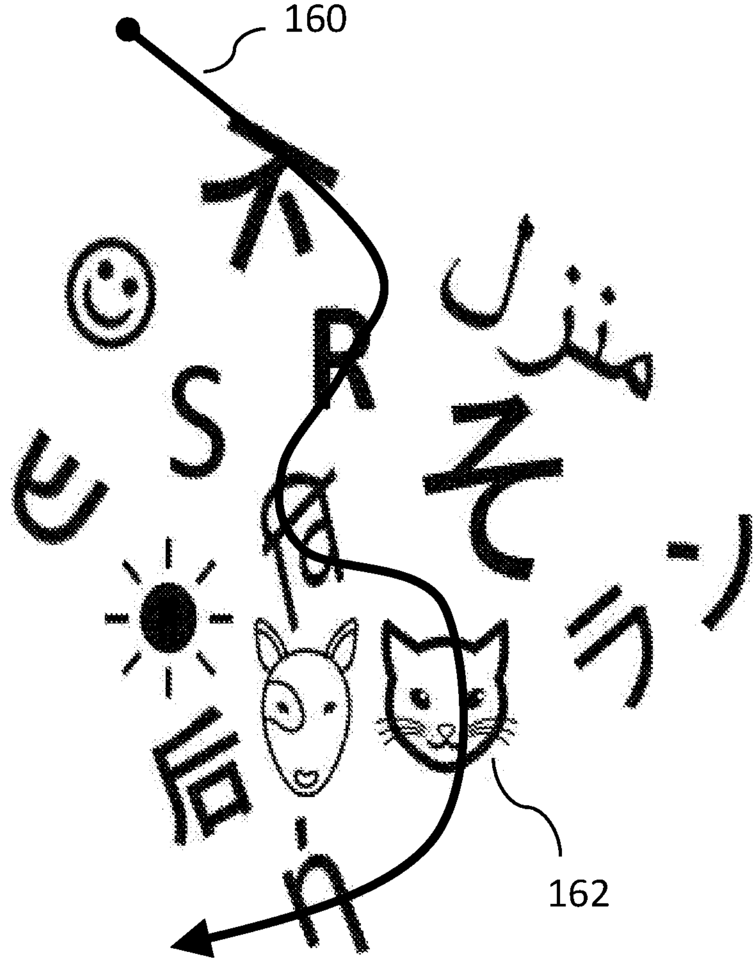
FIG. 18 illustrates password fragment selection using a connecting line which intersects with social media related digital footprint imagery.

FIG. 18 shows Hybrid1-group1 pfragments where the pet cat picture 162, a recent social media posting, is a valid replacement for the missing '양' character in connecting selection line 160.

These digital footprint methods can be combined with myriad other authentication signature clues, for example familiar sounds associated with a familiar location, and chip micro devices implanted into the user's body, the current state of applications on the user's device application signatures), etc.

Pfragment Selection

The pfragment identification selection process can proceed in a completely random order, or in an embodiment, the user must identify each displayed pfragment in a specific order, typically starting from the password beginning pfragment and continuing in correct sequence order, until the ending pfragment has been selected, resembling a normal (depending on language) left to right text entry typing order, illustrated in FIGS. 2A, 2B, 2C, 2D. By default the pfragment selection sequence order will generally mirror a user's language specific reading or text entry direction or orientation;

In still another embodiment, the system may observe user recognition of the password via analysis of biometrics like eye movement, which can include unconscious saccadic movements, iris size, pupil size, subtle facial movement or expression, etc., including biosensors like neural scanning devices which track brainwaves or neuron electrical activity, etc.

On extremely small screens, the user may select from an incomplete, limited set of pfragment choices, which if selected correctly, for example by sequence order, results in display of the next menu of pfragment identification challenges.

In all scenarios, the system can return a typical password potentially blended with entry pattern interaction data, including biometric data, and as the entry pattern changes every time, the system is more secure. Additionally password Unicode values are not necessarily sent to the user device—the user has to discern the correct values mainly by visual cues alone.

The exact pattern dimensions, as shown on the screen would not be required, which would make it much harder to reproduce or spoof, particularly due to the presence of the "noise" of false, decoy pfragments and visual imagery designed to obscure which are the valid pfragments.

Each time the password authorization process is presented, the exact pfragments can change, making the system much more difficult to spoof, because a pfragment location pattern wouldn't be repeated every time, in fact it could be a quite random pattern of screen locations.

Various devices, methods and gestures can be used to select and identify pfragments, adaptable to specific device ergonomics, particularly screen size, user preferences, required level of security, and tradeoffs between security and convenience. In this context, pfragment "element" refers to any individual discreet character, picture, or image component of a pfragment.

Pfragment selection involves identifying one or more constituent pfragment elements, which can involve use of a pointer such as one or more fingers, a stylus, a mouse, or an eye gaze tracker. And where the pointer is used to "touch" a discreet region of the screen or display, and where In this context "touching" can also mean tapping or touching, along with holding and pressing down, or combinations of the aforementioned methods.

The concept of "touch" can also refer to a touch thought, a touch action related neural or nerve impulse, or virtual touch movement gesture which is electronically measurable in a 3D virtual reality or holographic scenario. Touch selection can also involve any of myriad types of 3D gestures, such as finger, hand or body movements which can be measured by electronic means in 2 or 3 dimensional space.

In this context, the terms "selection" or "selecting" refers to any combination of the aforementioned methods used to identify a specific pfragment.

Password and Pfragment Selection Methods

The user can identify a password through multiple selection methods, depending upon preferences and circumstances. For example the user may be required to select all valid pfragments in random order, or in a precise sequence order, for example in start to end order.

Selection may optionally involve drawing lines connecting at least one element of each valid pfragment to at least one other valid pfragment, for example by drawing a line connecting the starting elements of each valid pfragment.

Unless otherwise noted, connecting line end point shapes in the figures always indicate line start, end points and drawing movement direction. Round shape end points indicate start points, and arrows indicate line end points and also the path traversal direction of the line.

Pfragment Selection Methods

In this context pfragment start or end elements can be referred to as "boundary" or "ending" or "first and last" or "terminal" element or elements, or just "termini".

A pfragment element which resides in between the start and end elements is referred to in this context as an "interior" or "non-terminal" or "non-boundary", or "non-termini" element.

In general, the more pfragments and pfragment elements the user is required to identify, the more precise and rigorous the identification procedure, and the greater the security level, but also the less the convenience.

The following selection/identification methods vary greatly in their levels of convenience and security.

Method 1: Selecting of any single, discreet pfragment element.

Method 2: Selecting a pfragment start or end element, or selecting both, either separately or simultaneously.

Method 3: selection of multiple pfragments using method 1 or 2 applied simultaneously to multiple pfragments.

Method 4: For any pfragment 4 or more elements long, selection method 2 is combined with selection of one or more additional constituent (non-termini) pfragment elements.

Connecting Line Selection Methods

In an embodiment pfragment identification requires the user to draw lines connecting pfragment-imgs in proper sequence order, thus forming a unique, irregular line pattern, where lines may be drawn by a pointer device such as a finger, stylus, mouse, eye movement tracking, nerve impulse, thought control, or neural implant device, etc. Lines may be required to be drawn avoiding crossing through decoy images, thus making the pattern even more irregular and difficult to spoof.

Because any line connection pattern is irregular and session specific, due to the random placement of pfragments, such a pattern would be hard to guess by conventional means.

Such a random connecting line pattern thus supplies an additional unique set of signature like data, which can include biometric details of touch pressure, fingertip size, movement speed, etc., providing an even more detailed and unique identification signature, thus increasing security.

Method 5A: Tracing or drawing a connecting line through all constituent elements of a specific password or pfragment, starting from either a beginning or ending element, while not crossing over any constituent element twice in the same direction.

Figure 12B:
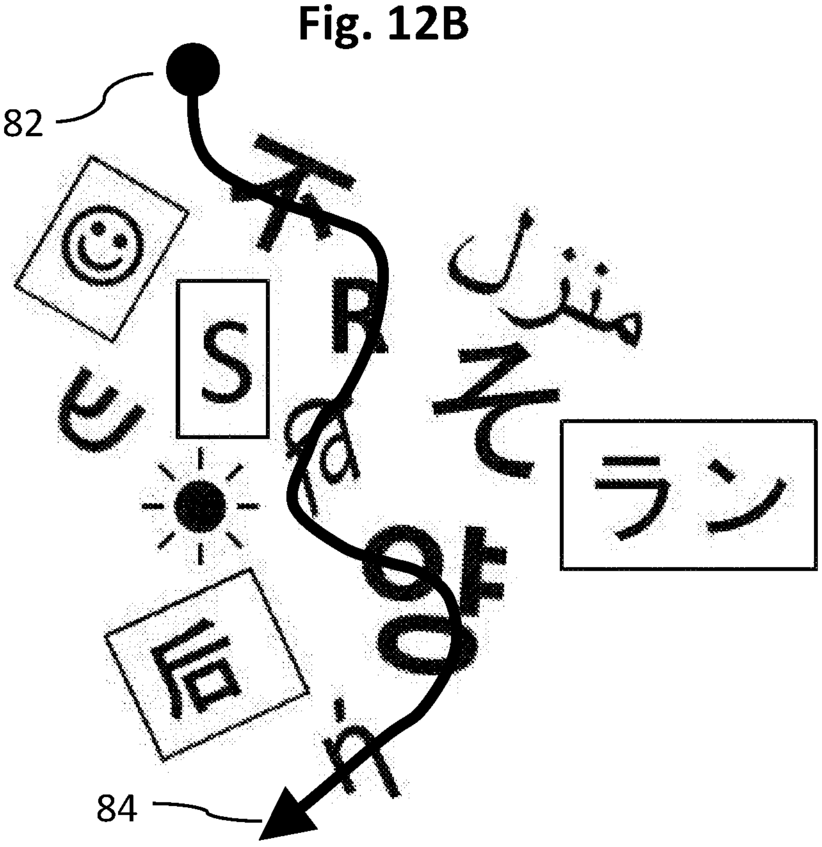
FIG. 12B shows how a curving line identifies a password component (pfragment) by connecting, in correct sequence, elements of a hybrid language character password.

For example FIG. 12B illustrates a line path drawn from starting position 82 to ending trace line arrow 84, connecting all the elements of Hybrid1-group1 initial pfragment "不 R तिঙή", beginning from start element 不 and terminating at end element ή, where arrow 84 indicates the line destination and direction.

Figure 19:
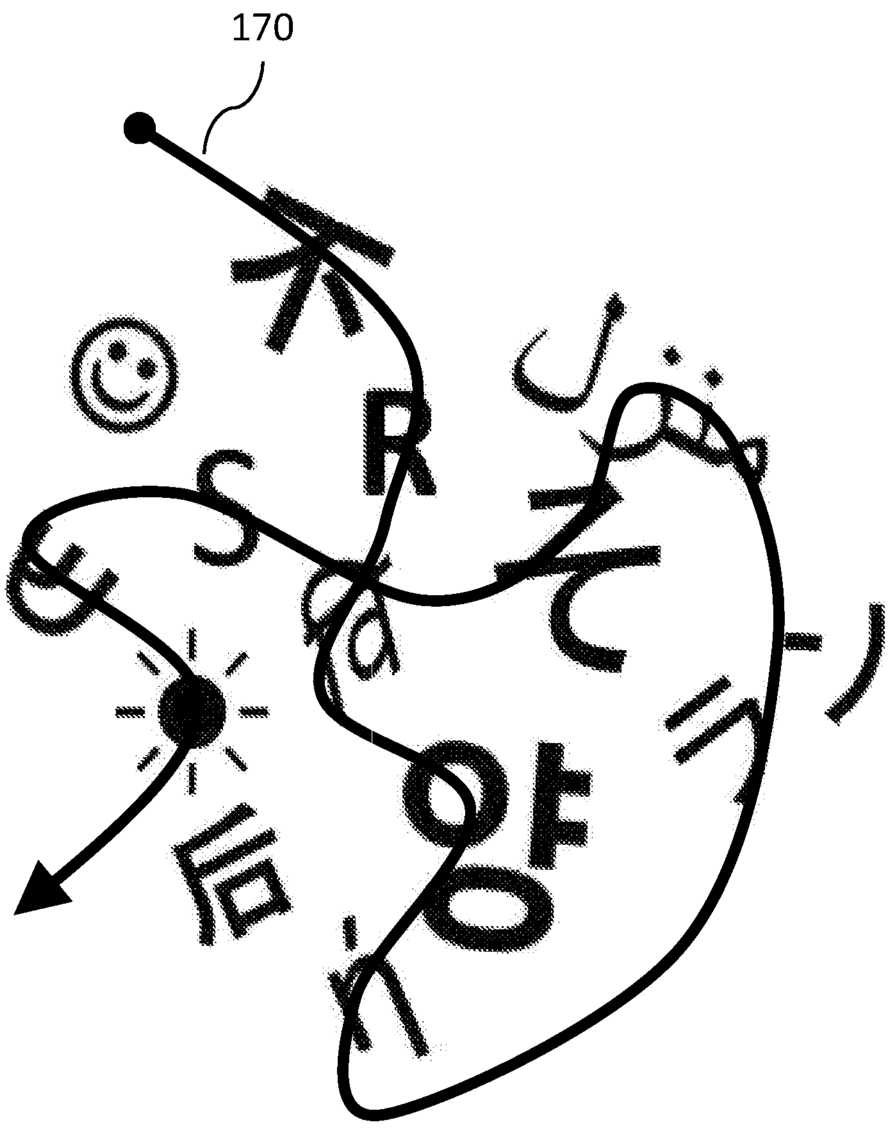
FIG. 19 illustrates password selection using a single line connecting all elements of a complete password.

FIG. 19, line 170 shows an example of how a single line is used select a password by connecting all elements of the Hybrid1 password.

Figure 16:
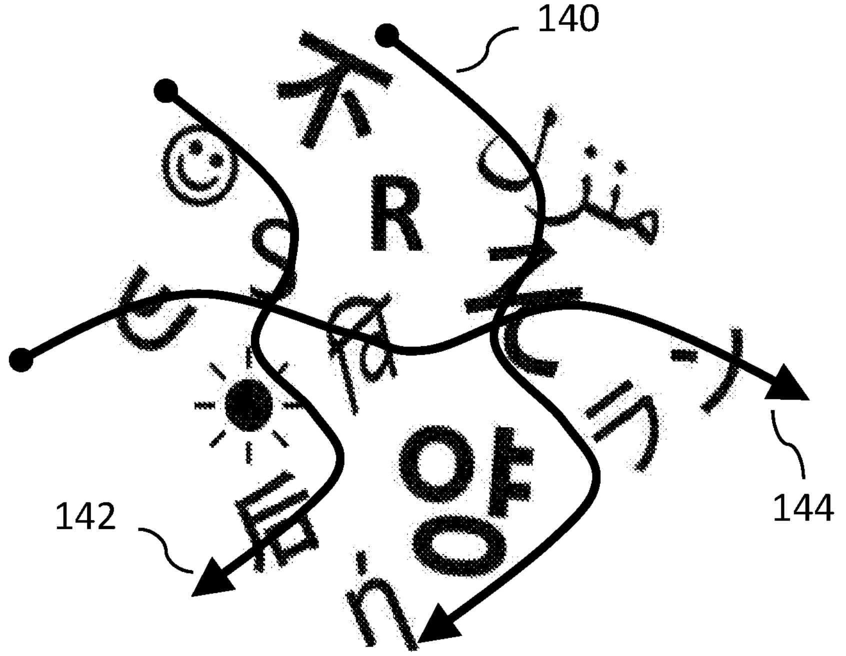
FIG. 16 illustrates password fragment selection using connecting lines which can be offset and of variable size, and also lines which can be fake decoys.

Method 5B: Tracing or drawing a line which reasonably represents the shape of elements of a specific pfragment or password arranged on a display. The line can start from either a beginning or ending element, while not crossing over any constituent element twice in the same direction. The line can be physically offset from the actual element display locations such that the line intersects with zero or many associated elements on the screen. The line size is not required to accurately represent the actual physical dimensions of the displayed elements the line represents; the only requirement is that line shape be reasonably accurate. For example the line shape can be completely offset (non-intersecting) and drawn to a much smaller scale than the actual dimension of the associated elements displayed. FIG. 16, lines 140, 142 are examples of such offsetting and variable dimension lines which represent shapes that describe the same Hybrid1-group1 pfragment selection.

Method 6: Tracing or drawing a direct line connecting starting and ending (termini) elements of a specific pfragment or password, illustrated in FIG. 12A with straight line 80 drawn between Hybrid1-group1 pfragment termini, connecting start element 不 with end element ή.

Figure 20:
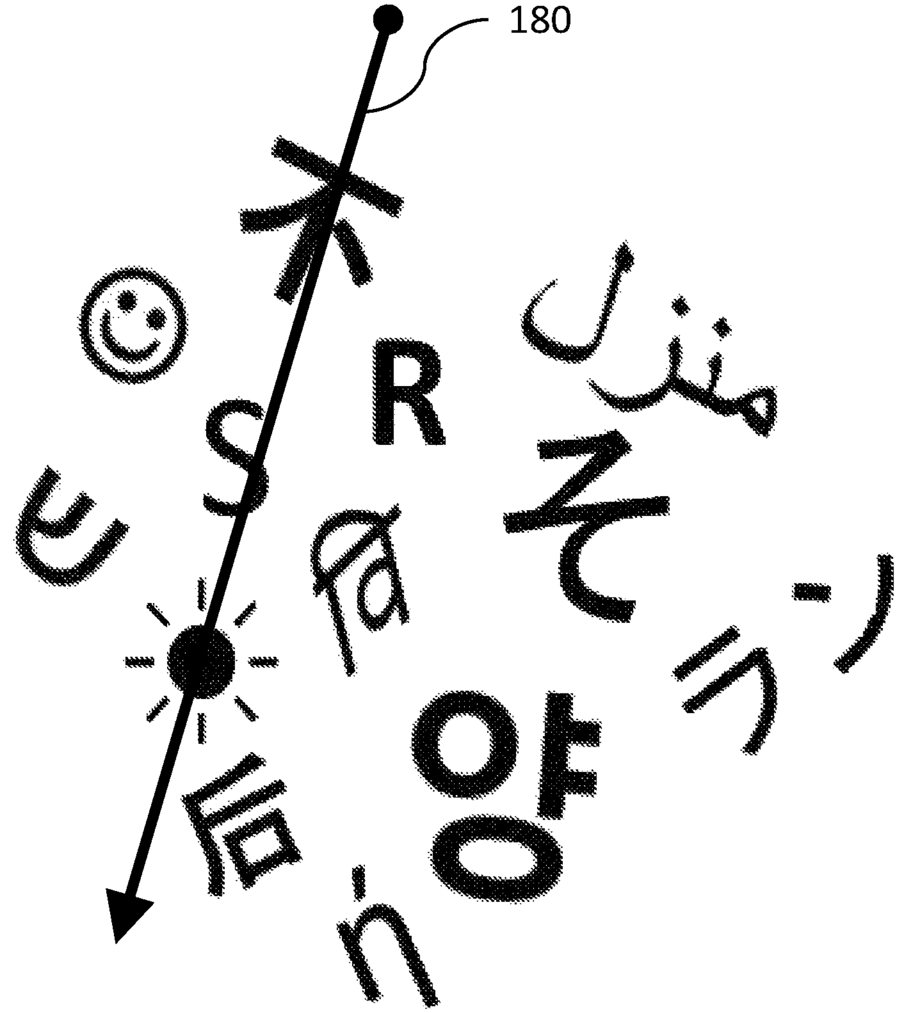
FIG. 20 illustrates password selection involving drawing of a line connecting just the first and last elements of a complete password.

FIG. 20 illustrates method 6 where line 180 connects the starting and ending termini) elements of the full Hybrid1 password, where the arrow indicates the directional path of the line.

Various connecting line selection/identification methods AND STRATEGIES are illustrated in FIGS. 10, 11A, 11B, 12A, 12B, 13A, 13B, 13C where single arrow lines indicate a specific pointer element connection (drawing) movement direction, and multi arrow lines indicate either direction of pointer movement.

FIG. 10 illustrates Chinese1, where lines 40, 42, 44 identify the valid pfragments by connecting all valid elements of each pfragment.

Figure 11A:
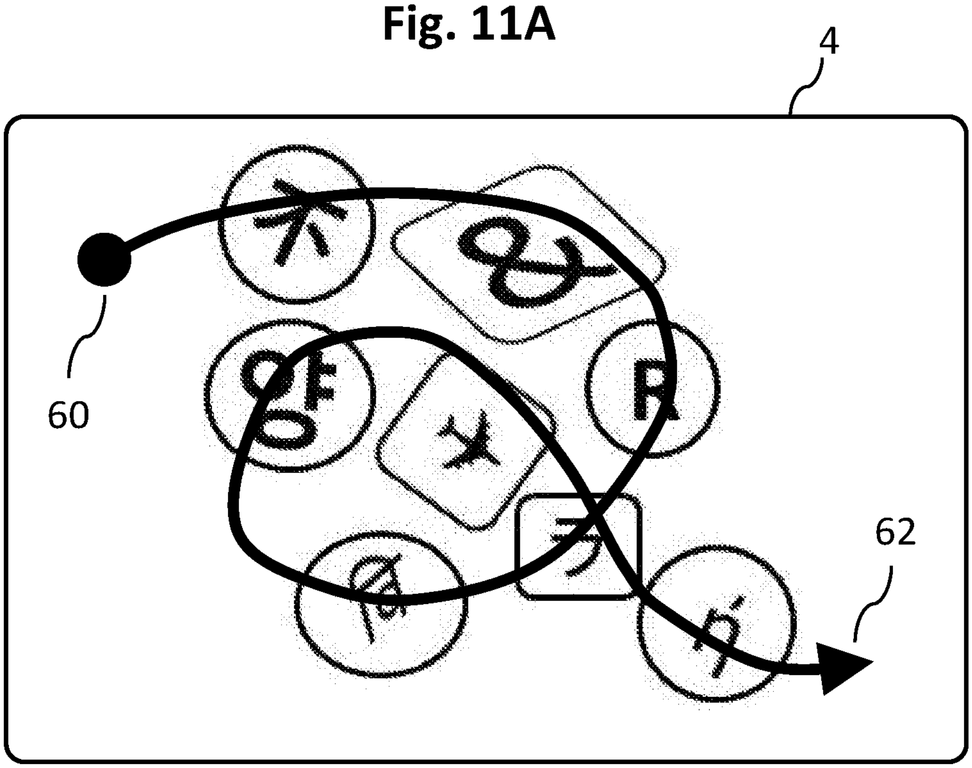
FIGS. 11A, 11B shows several possible layouts of a password segment (pfragment), illustrating how looping element connection lines can be used to identify valid pfragments, including crossing over invalid pfragment elements.

FIG. 11A illustrates a looping line selection path connecting all elements of the Hybrid1-group1 initial pfragment, starting from point 60 and ending at point 62, where the line also crosses 1 or more decoy pfragment elements.

Figure 11B:
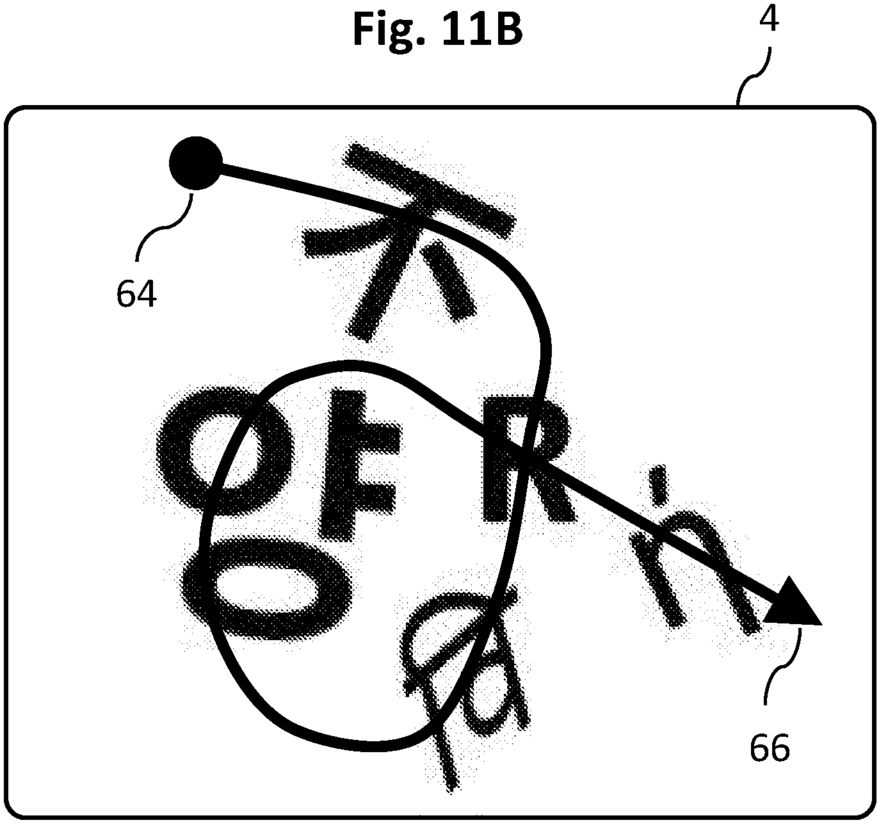

FIG. 11B is an example of a connecting line, starting at 64 and ending at 66, connecting elements of Hybrid1-group1 initial pfragment, where the line makes multiple crossings of the valid pfragment element "R", but where "R" is selected only once where the line initially crosses over from starting point 64.

Method 7: Spring loaded menus: The user can trace a path to select pfragments in a spring loaded menu, requiring navigation past decoy image choices, until tracing a path to a final ending pfragment value. The spring loaded menus, for example as illustrated in FIGS. 4A-D, may be alternating rows in any orientation, or even circular in format. The menu navigation process also creates a session unique path, which can also be supplied as unique user and session interaction data, further increasing security.

Concealing Selected Password Elements

A location offset selection method, illustrated in FIG. 16, is an effective way to conceal a selected pfragment from direct observation. The method involves tracing or drawing a line connecting pfragment elements, which shows the general shape of valid pfragment elements as displayed, but without requiring direct intersection with any valid element display regions; thus the line may intersect with zero or more valid elements as long as the overall shape pattern of the line accurately represents or reflects the relative layout display position of a group of valid elements intended to be selected. This method therefore does not require any secret transformation formula calculations to be applied to any of the elements, as is the case with similar methods applied to traditional keyboards—an example of such a conventional transformation method is seen in U.S. Pat. No. 7,725,712 B2

The length of the selection line can also be variable and doesn't have to reflect the true display dimensions of the elements intended to be selected. Thus both the location and length of the drawn line shape can be highly variable, adding another level of indirection which provides significant security advantages—the only requirement is that the line be a reasonable approximation of the shape represented by a set of valid pfragments or pfragment elements being selected. FIG. 16 is an example of these methods.

In the preferred embodiment the 3D orientation of the line shape matches the elements displayed, but alternate rotated orientations are optionally possible in some cases.

The shared secret of valid passwords or password fragments is thus embodied in shapes, which can change with every authentication event, therefore cannot be usefully copied. Such shape changes reflect the changing, random display locations of pfragment elements, which are rearranged with each new authentication screen, and where the exact pfragment elements displayed also changes because new pfragments are randomly chosen with every authentication session.

In an embodiment hand or other bodily gesture can be used to indicate the shape of the selected elements, gestures which do not require direct physical contact with the display.

which touch zero or more, but preferably not all pfragment elements.

Random offset location of the selection line makes it unclear exactly which elements the user intends to select. This is particularly true because of the contiguous display of pfragment elements, both valid and fake, meaning the line shape pattern could apply to potentially myriad combinations of elements displayed on the screen. Other factors which create ambiguity are the fact that the pattern only needs to be an approximation of the pfragment shape, the pattern can include fake elements, and that the length of the line doesn't have to match the actual displayed pfragment dimensions.

The inventive method uses offsetting line patterns which can be placed in random locations, which touch zero or more, but preferably not all pfragment elements. Thus even when directly observed, an attacker would have to consider a huge number of possible pfragments from the jumble of elements displayed. This is particularly true because a given randomly selected pattern can potentially represent a huge number of possible combinations of both valid and invalid pfragment elements. This effect is further magnified because the invention allows selection patterns to include both valid and fake elements.

In FIG. 16 lines 140, 142 are examples of offset lines which select pfragment "不R[illegible]", from "Hybrid1-group1". Both lines accurately describe the shape of the pfragment, where line 140 is also accurate in terms of length, but line 142 is shorter and smaller in length.

Selecting Fake Password Element Decoys

In an embodiment the user is required to select 1 or more fake decoy pfragments or pfragment elements in addition to the intended valid elements, a strategy which makes the true pfragments even more difficult for an attacker to guess. This strategy can be applied to any of the pfragment selection methods, including connecting lines.

This offset strategy involves connecting line patterns which correspond to a valid pfragments, but because the lines are offset in a random manner from the actual pfragment elements, it's very unclear to an attacker, even under direct observation, exactly which valid pfragments were identified.

Figure 17:
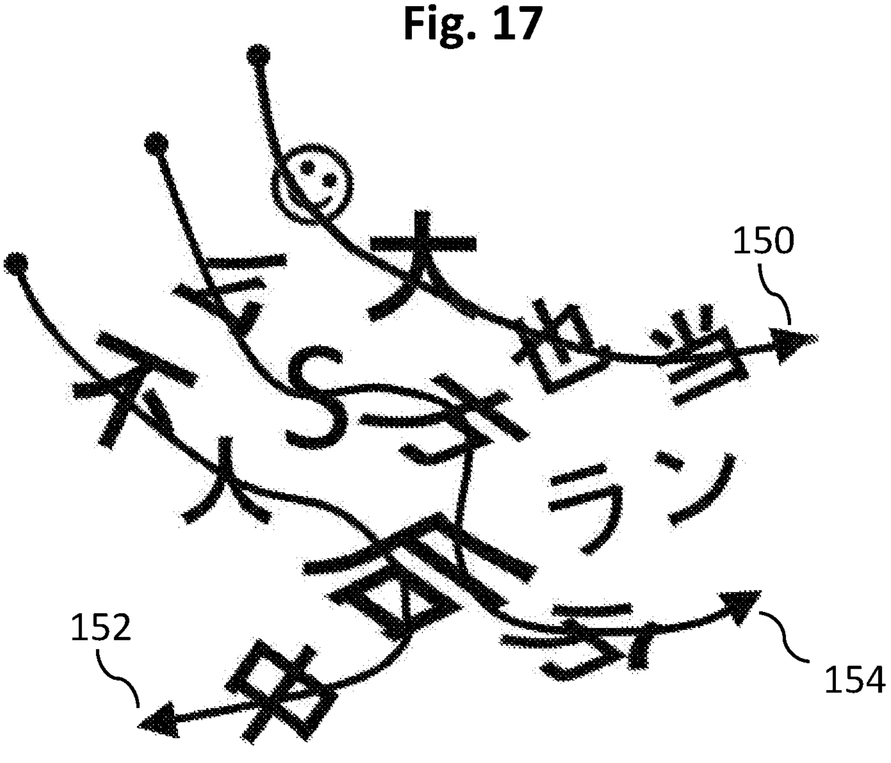
FIG. 17 illustrates password fragment selection using connecting lines which intersect with both real and fake decoy password elements.

FIG. 17 shows connecting lines 150, 152, 154 which select pfragments from the Chinese1 password, where each line includes at least one fake decoy pfragment element in the path.

Line 150 includes the fake decoy 'smiley' (☺) smiling or happy face emoticon element.

Line 152 includes the decoy element '后' which is actually a valid element of a related pfragment of the password's pfragment set.

Line 154 includes the fake decoy 'S' Roman Latin character element

In another embodiment the user must also draw at least 1 fake connecting line pattern, where the fake line does not resemble the pattern of any valid pfragment on the current display. This completely fake pfragment selection line adds an extra layer of security, making it even more difficult for an attacker to guess the real password.

In FIG. 16 line 144 is an example of a fake selection line which connects certain valid password elements, but which do not belong together, and it also includes fake decoy elements. Additionally, line 144 lacks a shape resembling any valid pfragment groups shown on the display.

Dynamic Menus

On very small or cramped screens or displays it may be difficult to efficiently show all pfragments simultaneously on the same screen, thus the authentication process can be broken into multiple consecutive (sequential) dynamic menu screens, where each menu shows 1 or more visually obfuscated pfragments. When each pfragment is selected in proper element sequence, the next pfragment menu is displayed, with the process repeating until the final, terminal pfragment has been selected, thereby authenticating (or verifying) an authorized user.

Figure 13A:
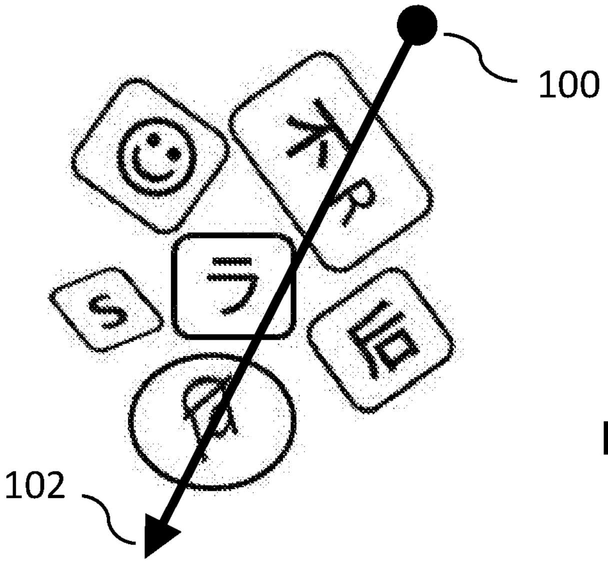
FIGS. 13A, 13B, 13C illustrate how a group of related password segment components pfragments) can be individually consecutively displayed and selected on space challenged visually cramped screens, where correct selection of 1 or more pfragments on the current display results in the display of the next pfragment selection menu, repeating until the final pfragment has been successfully selected.
Figure 13B:
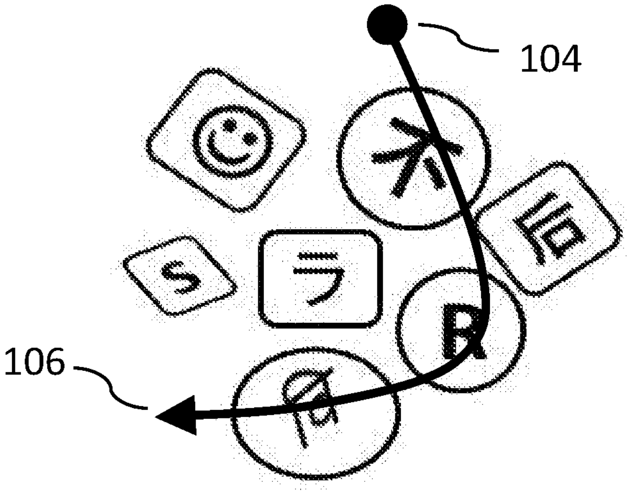
Figure 13C:
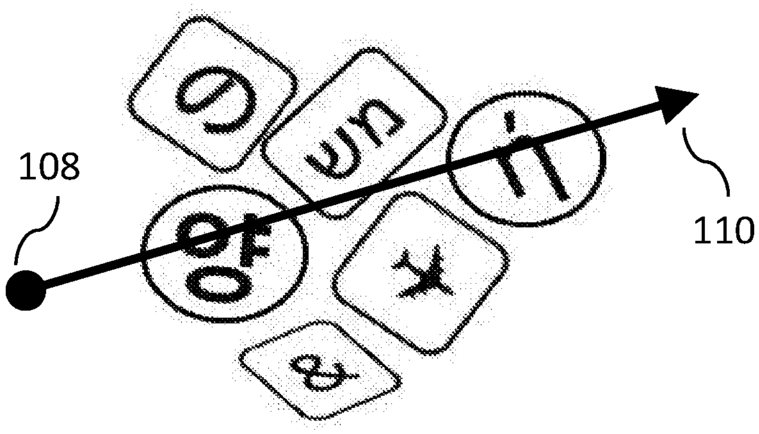

In such a scenario pfragments are relatively short. FIGS. 13A, 13B, 13C illustrate an example of the Hybrid1 password where the user must first correctly select an initial short Hybrid1 pfragment FIG. 13A or 13B), which results in the FIG. 13A or 138 menu being replaced by the FIG. 13C menu, where the user must correctly select the [illegible], pfragment. Arrows 102, 106, 110 indicate each connecting line's destination ending element and movement direction, where 100, 104, 108 indicate each line's starting point.

FIGS. 13A, 13B also illustrate 2 possible ways of displaying the same Hybrid1 initial short pfragment characters or elements.

Spring Loaded Pfragment Menu Selection

A spring loaded menu (SLM) system has the advantage of allowing the user to see ahead for clues as to which potential next pfragment menu options are available, a context which helps inform the recognition process of the current pfragment menu choices.

A SLM can increase security by returning a more complex value derived from a pointer navigation path and associated biometrics, rather than just simple Unicode values.

In this context, the terms "menu", "row" and "row menu" are used interchangeably and refer to any related group of menu cells sharing a common, distinct display region, of any shape, topology, geometry or 2D, 3D orientation. For example a menu row can be curved or circular in shape, in addition to the more standard horizontal table row form seen in FIGS. 4A, 4B, 4C, 4D.

In this context "menu cell" or just "cell" refers to a discreet menu display region, which is bordered by other adjacent cells (if any) in a generally contiguous manner, where such cells are responsive to the presence or absence of a pointer inside their display region.

A menu consists of 1 or more cells, where each cell can have a unique associated child menu, whose display requires pointer presence in the cell.

In this context, pointer entry or pointer presence refers to a pointer which has entered into a specific trigger zone of a menu cell display region, called "cell activation", normally triggering the display of any associated child menu row. Pointer absence, or movement out of a cell trigger zone, called "cell deactivation", normally hides any associated, displayed child menu. Pointer movement out of 1 cell and into an adjacent cell normally first hides any currently displayed child menu, then displays the newly entered cell's associated child menu (if any).

In this context, cell activation or deactivation can also trigger additional actions like highlighting or un-highlighting of a cell. In the descriptive examples, activated cells are shown highlighted with bold borders.

A parent menu can have multiple associated child menus, normally 1 for each parent menu cell. Cells serve as display navigation bridges, zones which allow pointer traversal from a parent to a child menu.

An Alternating SLM (ASLM) is a special type of SLM that normally simultaneously displays a maximum of 2 menus, a parent menu and optionally one of its associated child menus.

An ASLM normally has 2 primary, relatively fixed, contiguous, side by side menu display locations, A parent or child menu can be shown in either location, and the position of parent and child can alternate between the 2 locations as menus are navigated.

During menu navigation the ASLM constantly reuses and recycles display space used by previously displayed menus; before another menu is displayed, any previously displayed menu in the same location is hidden, making ASLM well suited for navigating through large amounts of data on small, cramped displays.

The 2 display locations are normally opposite each other, sharing a common center axis; the 2 locations typically correspond to an axis orientation, which can involve any 2D or 3D orientation, shape or path. In simple horizontal and vertical orientations locations can be described in relative position terms like top, bottom or left, right.

Child menu display is transient—as a pointer moves from one parent menu cell to another, each cell's corresponding child menu, if any, is displayed, after first hiding any currently displayed child menu.

A child menu becomes the new current parent menu when a pointer is moved from a parent menu cell into a parent cell's adjacent associated child menu. This process also selects the cell's pfragment value and hides the last parent menu. Subsequent child menus are now displayed in the opposite location corresponding to the previous parent menu.

These menus are used to navigate (step down) the branches of a pfragment menu option tree, from parent to child, where menu cells represent and display the pfragment node values of each specific branch.

This process of parent to child menu navigation reflects the step wise traversal down the branches of a data tree.

Figure 4A:
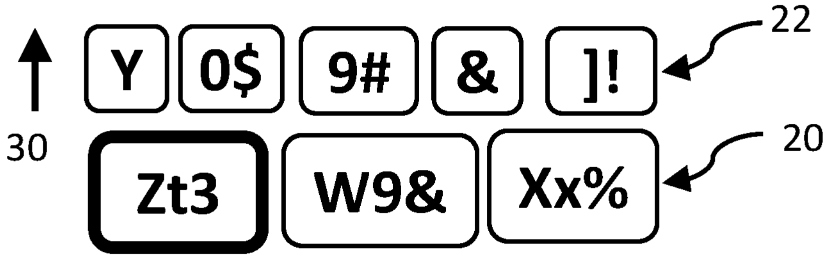
FIGS. 4A, 4B, 4C shows a sequence of alternating spring loaded menus used to select password components.
Figure 4B:
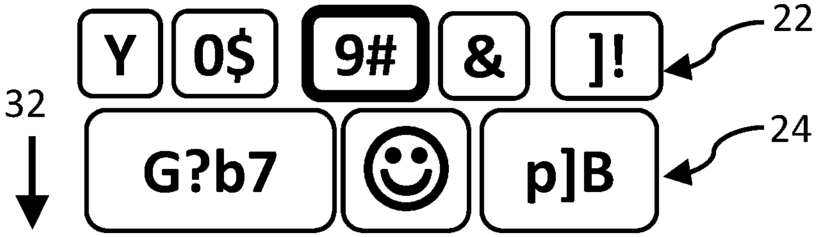
Figure 4C:
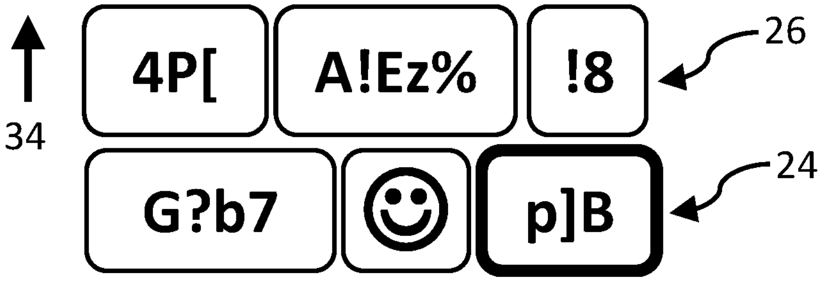

FIGS. 4A, 4B, 4C illustrate selection of example Latin1-group1 pfragments using a horizontally oriented ASLM, with top, bottom relative menu positioning.

The figures show both parent and child menus, where arrows 30, 32, 34 indicate the up or down direction of child menu relative display positions, either above or below their respective parent menus, and where activated parent menu cells are shown with bold borders.

Parent and child menus are shown displaying in alternating fashion across a virtual horizontal line, the shared row top/bottom border. Menu cells activated by pointer presence are shown with bold borders.

FIG. 4A shows initial parent menu row 20 where menu cell "Zt3" (bold border) has just been entered (traversed) and activated by a pointer presence, triggering the display of child menu 22 above in the top location, where arrow 30 indicates the up display direction.

FIG. 4B shows next that top row menu 22 has been entered by pointer from menu 20, hiding menus 20 and making 22 the current parent menu. Next it shows that menu cell "9#" bold border) has subsequently been entered (traversed) and activated by a pointer, triggering the bottom position display of child menu 24, with the down display direction indicated by arrow 32.

FIG. 4C shows next that menu 24 has been entered by pointer from menu 22, hiding menu 22 and making 24 the current parent menu. Next it shows that menu cell "p]B" has subsequently been entered (traversed) and activated by a pointer, triggering the display of child menu 26 above, indicated by up arrow 34. Menu 26 contains the final pfragment "!8" menu cell which the user must enter to select and complete the password.

ASLM Navigation Traversal Path

Figure 4D:
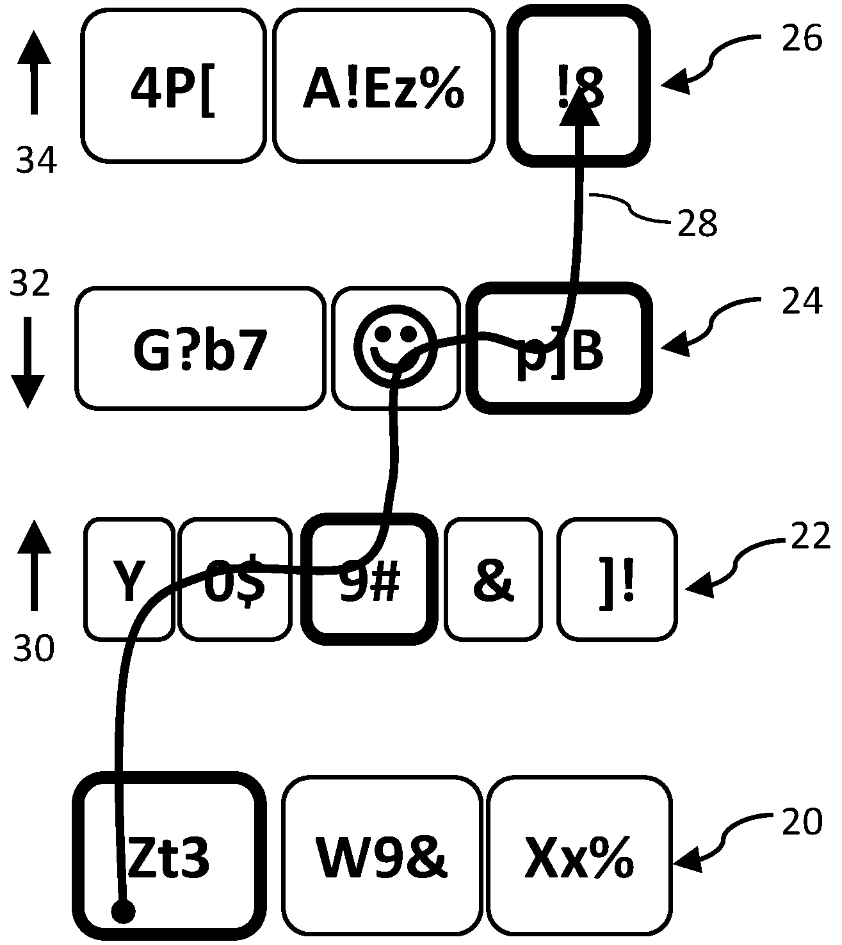
FIG. 4D shows a pointer traversal path navigating a sequence of alternating spring loaded menus used to select password components (pfragments).

An ASLM navigation path is somewhat similar to a user drawing connecting lines through statically displayed pfragment elements, except using a more compact motion. FIG. 4D illustrates how parent and child menus displays are connected via traversal of a parent menu cell, which selects the cell pfragment value, and makes the child menu the next current parent menu, a process that repeats until the final valid pfragment value has been selected.

FIG. 4D illustrates ASLM traversal, involving selection of a group of menu cell pfragments, in the following order: "Zt3, 9#, p]B, !8", where bolded cell borders indicate activation by pointer presence.

Line 28 illustrates the path a user traces or draws to select each valid pfragment in this order: Zt3, 9#, p]B, !8, while avoiding fake, decoy pfragment cells. Starting from pfragment cell "Zt3" of row 20, navigation line 28 traverses, in the following sequence order, menus 20, 22, 24, 26, where each menu row in the order is a child menu of the prior row, and also a parent menu of the next or subsequent menu in the path. Arrows 30, 32, 34 illustrate the top or bottom relative position (up or down direction) where each arrow's adjacent row menu would normally display.

As the pointer exits each valid pfragment cell into the associated child menu row, the cell's pfragment value is automatically selected and concatenated to the sum of all the previously selected pfragment values in the 28 path, thus eventually selecting all valid pfragment components of password Latin1-group1.

In an embodiment, valid pfragment cell value can also be selected by various touch and or hover related gestures.

Recall Preferences

Patterns are formed by pfragment-img display characteristics such as relative screen locations, animations, pfragment-img shapes, and the lines which can be drawn connecting pfragment-imgs. Such patterns can be specified as user preferences, which can be used to assist user recall and recognition in challenging situations, for example a password unused for a long period, or when authentication involves particularly challenging user interface ergonomics, which may be any combination of factors such as such as demanding multi-tasking situations, poor visibility, small or cramped screens, single hand usage, interaction while wearing gloves, while operating a vehicle or equipment, driving, exercising, moving, on a crowded commuter train, walking down a crowded sidewalk, and critical emergency or military battlefield situations.

Movement patterns are a significant form of automatic unconscious memory—for example through practice musicians train themselves to automatically, unconsciously coordinate extremely complex, rapid sequences of precise hand and finger movements on an instrument. Musicians generally don't remember or play individual notes, but rather play using automatic pattern movement pattern memory. Similarly password entry generally tends to rely at least partially on automatic movement memory like keyboard or keypad typing patterns, as much or more than recall of specific password characters. Thus preferred or more frequently used patterns may be used to assist with user recall and recognition.

If a password hasn't been used in a long time, user recognition and recall can also be assisted by utilizing fewer, longer pfragments, and minimizing visual noise or clutter such as fake decoy password data. Relative pfragment display locations form a pattern which can aid in password recognition, therefore the last or most frequently used location patterns can also be used to assist recall and recognition.

Once the authentication display has been calculated and rendered, the user is challenged to identify which pfragment images represent actual components of the password, using a pointer device such as a finger, mouse click, eye movement, gaming joy stick, or even biosensors like neural implants, nerve biosensors, or even thought control detectors.

Pfragment Selection Correction and Deletion

Figure 2C:
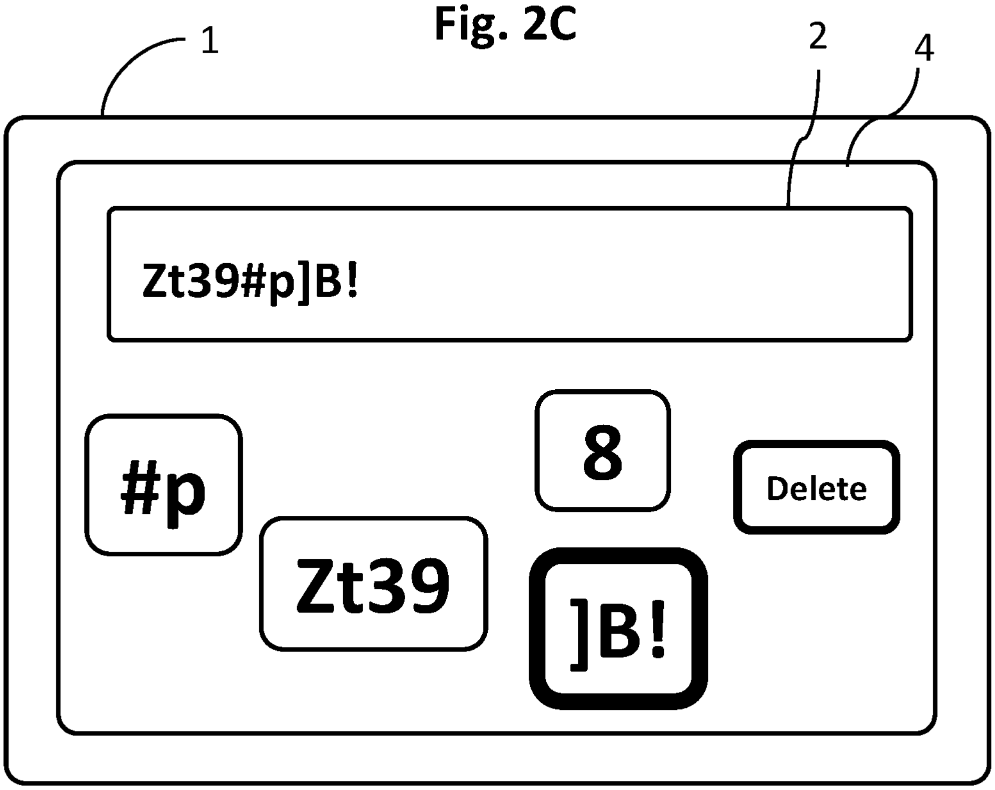
Figure 2D:
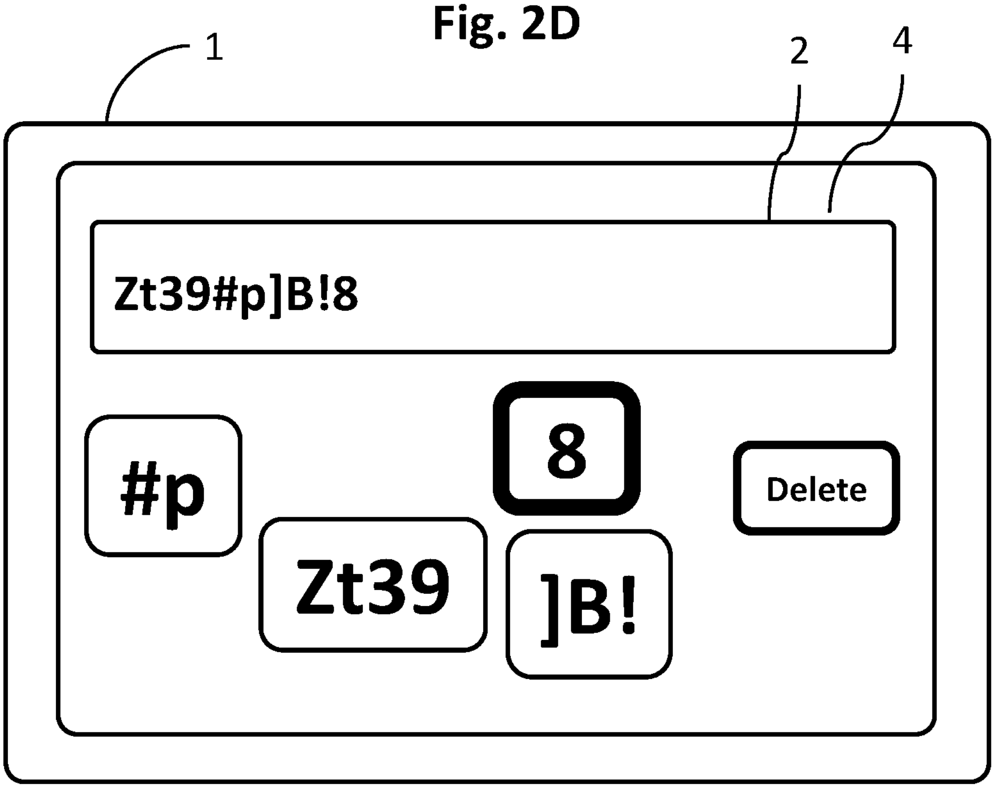

In the inventive authentication scenario, the delete or back key mechanism will normally delete or negate the last selected or entered pfragment, not individual letters or characters—for example in FIG. 2C the "#p" pfragment has just been entered—if the user then pressed the delete key (also FIG. 2C), the "#p" pfragment characters would be deleted from the previously entered pfragments shown in the text entry field.

Synergy and Compatibility with Other Authentication Methods

The inventive methods described are complementary and compatible with most other standard authentication methods, and are designed to work synergistically with most any methods, including biometrics.

Ergonomic Thumb Interaction Password Menu Layouts

Thumb user interface (UI) interaction, for example thumb typing, is common and convenient on mobile devices due to the need to also hold and cradle the device, generally leaving only the thumb free for interaction; Pfragment menus can be arranged in curved layouts that reflect optimally ergonomic thumb typing arc motions, allowing for easier usage on mobile devices. In this context "user interface" or UI refers to display interaction or input mechanisms such as keyboards, menus, widgets, buttons or other controls displayed on a device display.

Thumb typing or interaction in this context assumes one or both hands cradle a handheld computer device, and the thumbs of the cradling hand or hands are the primary, though not necessarily the exclusive means for operation of the virtual screen user interface controls. Devices in this context are generally "smartphones" or tablet type computers that normally have a touch screen where a virtual user interface, keyboard or menu can be displayed.

Figure 14A:
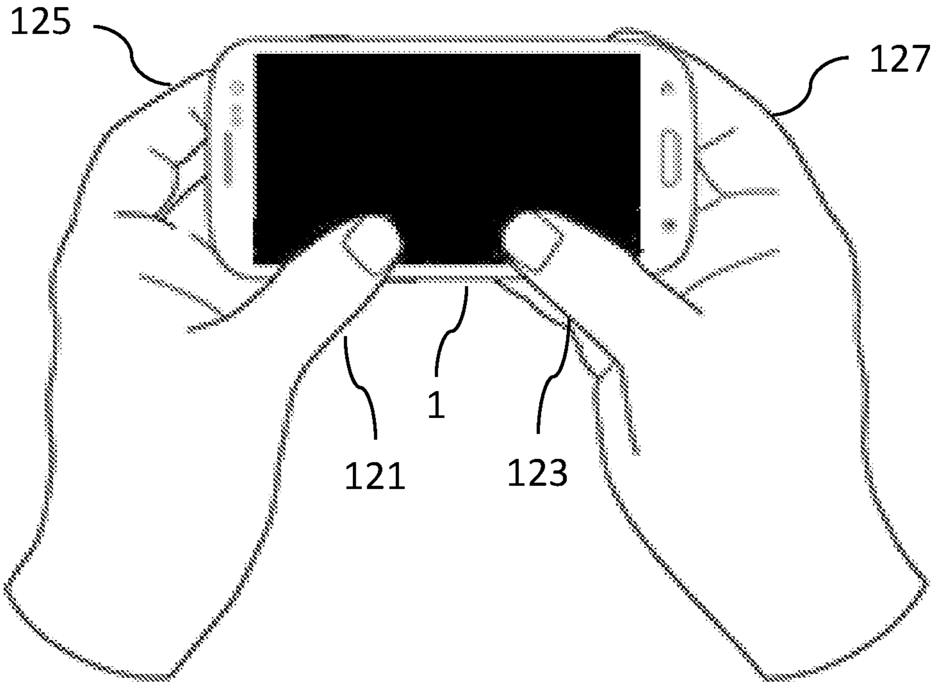
FIG. 14A illustrates common hand and thumb positions used with dual thumb typing on a small mobile computer device.

When cradled by both hands, the device is generally supported from behind by some combination of the palms and the four non-thumb fingers (index, middle, ring and small/pinky), or a subset of such fingers, normally leaving the thumbs, 121, 123 in FIG. 14A, free in the front of the device virtual screen.

There are myriad possible variations of such cradling finger positions, but typically in dual hand mode, one or both index fingers are at least partially located near or contacting the sides of the device, and frequently pinky or other fingers may also support and cradle the device, via contact with a different opposing side of the device. This is depicted in FIG. 14A. which shows both thumbs (121, 123) free for screen interaction, and where both index fingers 125, 127) are shown at the sides of device 1.

Single hand cradling however can also involve myriad non-thumb finger and palm cradling variations.

Thumb UI interaction such as typing can be difficult and awkward when the thumb has to frequently bend at the second knuckle in towards the palm. This is particularly an issue for those with painful or stiff fingers, for example due to medical conditions like arthritis, but even for persons without a medical condition, bending of the thumb can be uncomfortable for more than very brief periods and lead to challenging and inaccurate text entry on a virtual keyboard.

Rapid, efficient, comfortable thumb UI interaction movements are generally easiest when the thumb moves in a curving, arcing motion, with the thumb fully extended, and with the thumb tip loosely bent or held relaxed, very minimally bent at the second or minor mid-finger distal interphalangeal (DIP) joint knuckle.

As used herein, the terms "relaxed" or "loosely unbent" thumbs refers to a comfortable position of the thumb interphalangeal joint knuckle that is slightly bent, by about 10° to about 30°. The inward motion at this joint is called "flexion" where the thumb tip is bent inward at the interphalangeal joint, and "extension" when the thumb tip is bent outward at the interphalangeal joint. The arc (the "arc") of the thumb tips is defined by an abducting or adducting motion, in which abduction is the thumb tip moving away from the forefinger in the plane of the palm, adduction is the thumb tip moving toward the forefinger in the plan of the palm. This is also termed "Radial Adduction/Abduction." These terms are further defined and well-illustrated on the website of the American Society for Surgery of the Hand, at www.assh.org/Public/HandAnatomy/Pages/default.aspx. The ergonomic sweet spot for thumb typing is at the arc defined by this sweeping, pivoting (abducting or adducting) motion of the thumb, between a thumb near and far position relative to the forefinger.

Figure 14B:
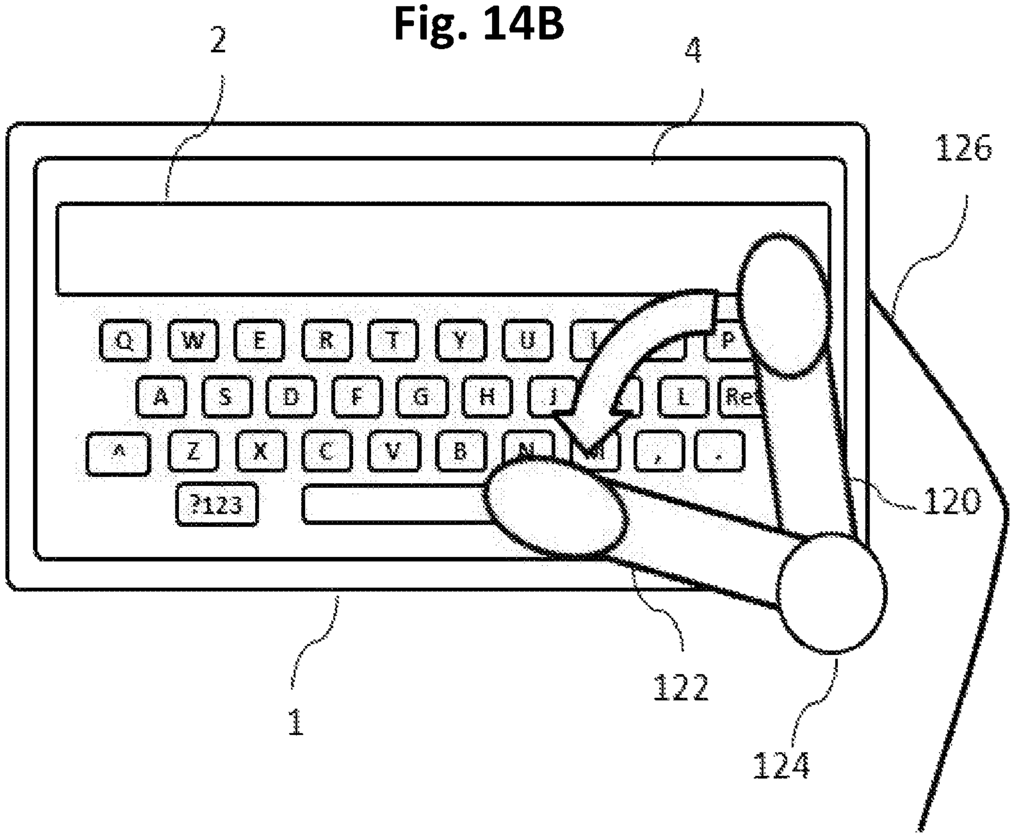
FIG. 14B illustrate common hand and thumb positions and related ergonomic thumb motion associated with thumb based screen interaction on a small mobile computer device.

The sweet spot is shown schematically in FIG. 14B, depicting typical right hand thumb typing or general UI interaction movement range, with near (120) and far (122), positions, where the curved arrow indicates the thumb arc motion between the two positions when pivoting from the thumb's pivot point (124). Index finger 126 is shown in a supporting position at the edge of the device, though other fingers and/or multiple fingers could also be used in the same location.

The exact location and shape of these arcs varies depending upon factors like the user's hand dimensions, cradling techniques, and the dimensions of the device, virtual screen and virtual keyboard.

Arc curvature can vary from relatively flat semi-oval to more symmetrical and circular in shape.

In an embodiment, the device may automatically determine the position of the thumbs relative to the virtual keyboard or UI at any given moment, by sensing the user's hand dimensions, current hand and finger positions, device orientation (for example portrait or landscape), current cradling technique and past text editing history.

Thumb positions are used to calculate optimal arc shapes and locations, which are then used to determine the easiest, most efficient pfragment menu layout in any given thumb interaction circumstance.

Quarter Circle (Qc) Arcs

The side quarter circle arc ("qc arc") is one of the most common thumb motion arc patterns, resembling a quarter circle going from the UI or keyboard top sides (the near position) to the keyboard bottom center (the far position), where the arc curvature can also be semi-oval in shape. Such qc arcs are depicted in FIGS. 14B, 14C, 14D, 14E.

Qc arcs typically involve one or both index fingers located at the sides of the device near the sides of device screen near to the user interface (for example a menu or keyboard). The near thumb position usually places thumb tips near the user interface top region, close to the edges of the device; for example in a QWERTY keyboard layout, near position thumb tips are directly above or adjacent either the Q or the P keys. The thumb far position (122) typically places thumb tips near the bottom center of the device screen or user interface.

Figure 14C:
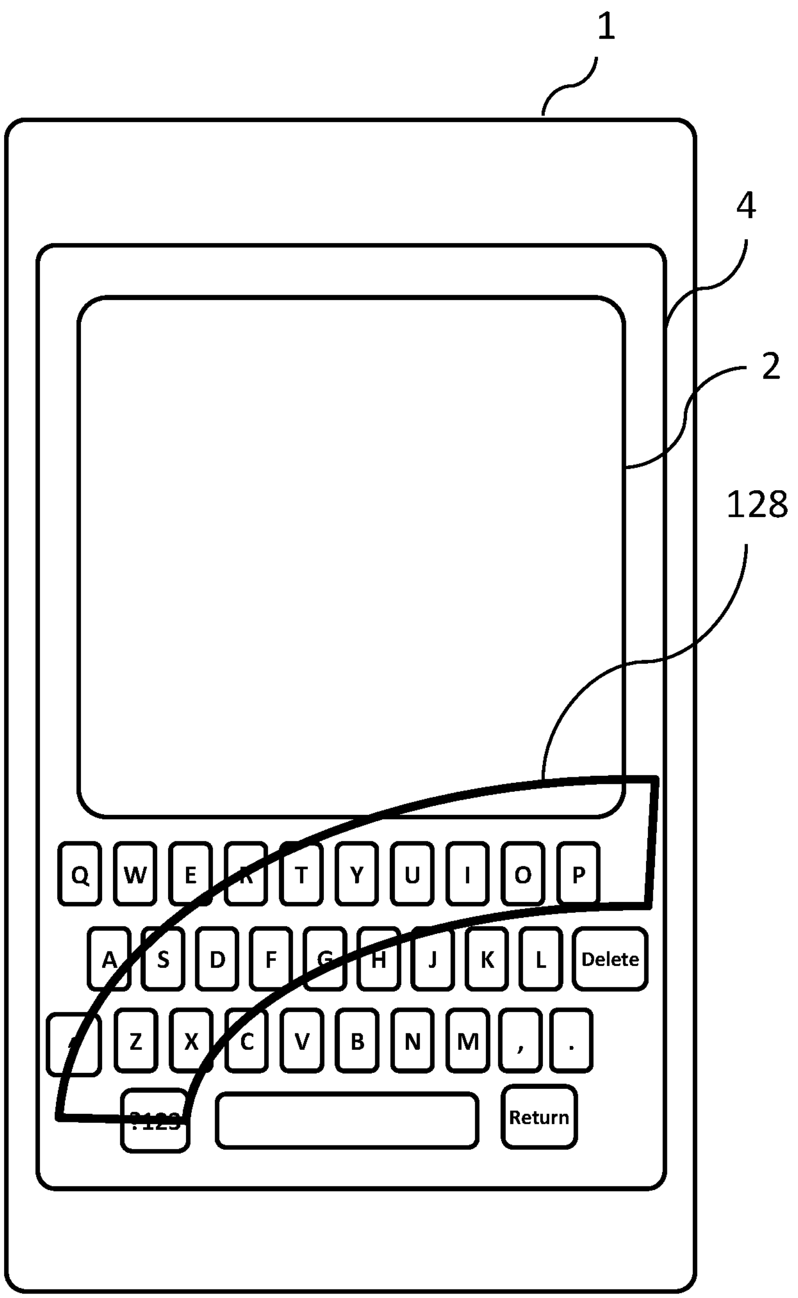
FIGS. 14C, 14D, 14E, 14F illustrate common ergonomic thumb motion arc patterns associated with thumb typing and other thumb user interface interaction on mobile devices.
Figure 14D:
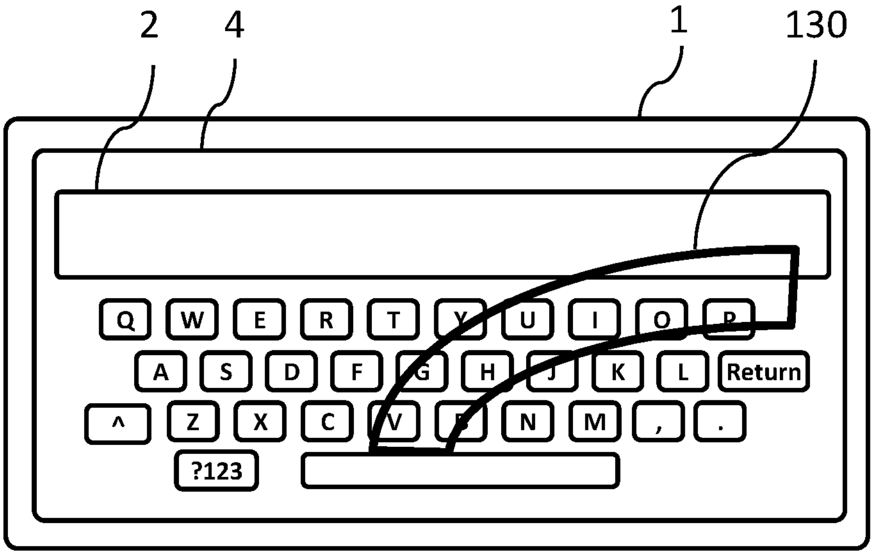
Figure 14E:
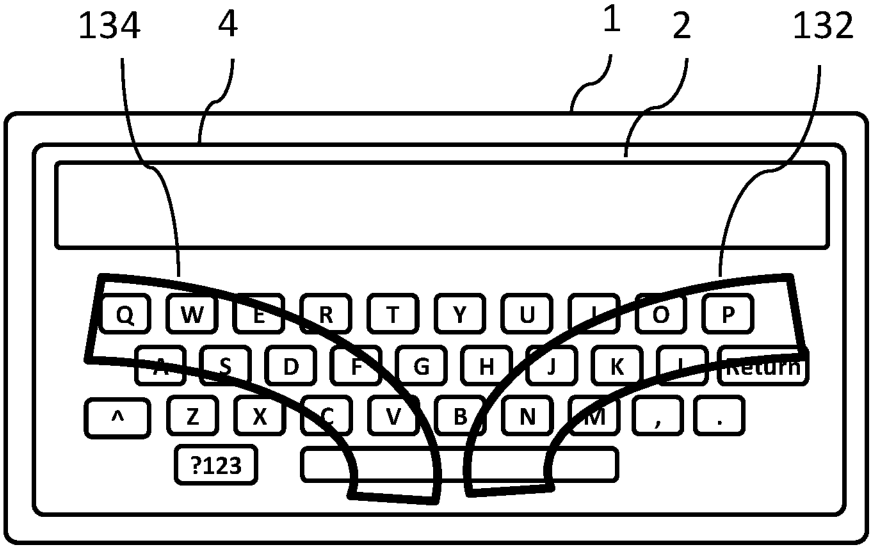

FIGS. 14C, 14D show typical single right hand usage thumb qc arcs 128, 130 overlaying a standard QWERTY keyboard Dual qc arcs at opposite sides of a device screen is a common two handed thumb UI interaction movement pattern, depicted in FIG. 14E with movement arcs 132, 134 overlaying a standard QWERTY keyboard.

Bottom ARCS

The bottom arc is another common arc pattern frequently seen with single hand use, particularly when mainly the fingers support the device. This arc involves near and far thumb positions located on opposite sides near the bottom of the keyboard. The resulting curve resembles a flattened semi-circle, arching slightly upward in the middle of the screen, then down at the screen sides.

Figure 8:
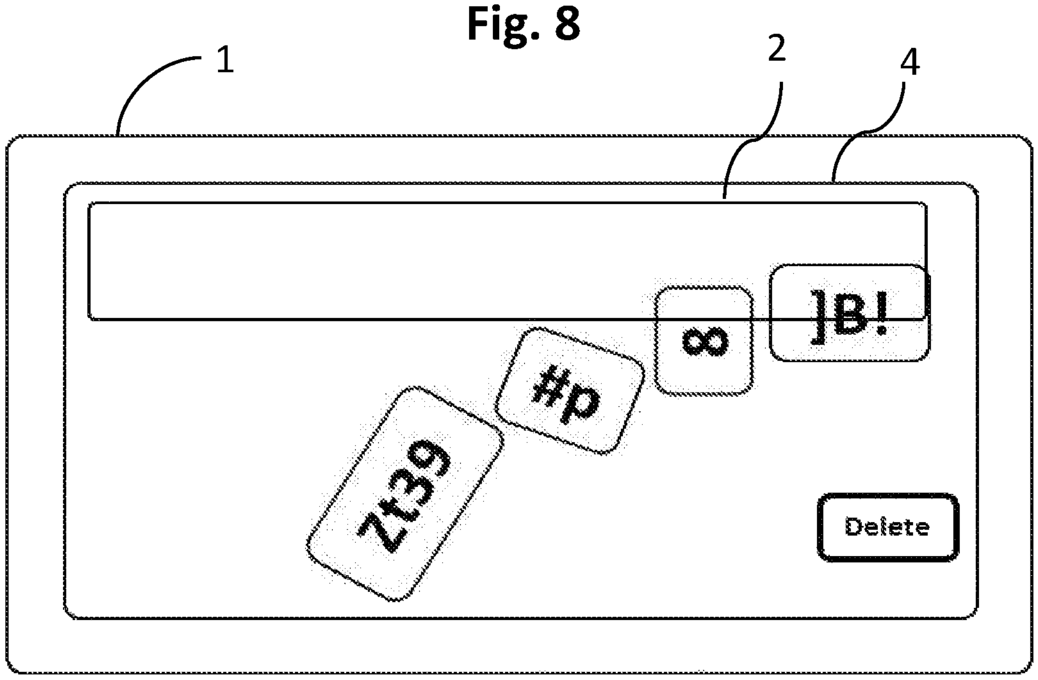
FIG. 8 illustrates password segments displayed in a curving, arcing layout, ergonomically optimized for thumb typing.
Figure 14F:
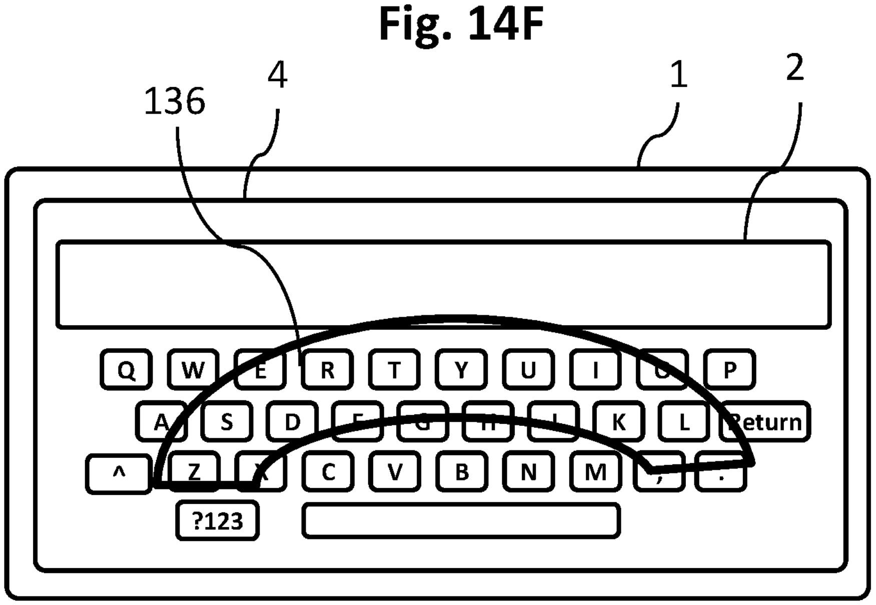

FIG. 14F depicts typical single hand bottom thumb movement arc 136 overlaying a standard QWERTY keyboard, FIG. 8 illustrates password Latin1-group1 pfragments displayed in a curving, arcing menu layout ergonomically optimized for thumb UI interaction.

FIG. 15 illustrates Hybrid2-group1 pfragments arranged in an ergonomic thumb movement interaction arc pattern, where both valid and fake pfragments are shown mixed together.

NOTES, REFERENCES, DEFINITIONS AND BACKGROUND INFORMATION

Web resources (URLs) listed in the specification can alternatively also be found by keywords under www.vericruz.com/info or www.cruzid/info 2D, 3D: respective abbreviations for two and three dimensional (X,Y and X,Y,Z axes) display, orientation, perspective and related views of data.

ASCII: Originally based on the English alphabet, ASCII encodes 128 specified characters into seven-bit integers. ASCII was incorporated into the Unicode character set as the first 128 symbols.

(www.wikipedia.org/wiki/ASCII)

Biometrics: refers to metrics related to human characteristics. Biometrics authentication (or realistic authentication) is used in computer science as a form of identification and access control. Biometric identifiers are the distinctive, measurable characteristics used to label and describe individuals. Biometric identifiers are often categorized as physiological versus behavioral characteristics. Physiological characteristics are related to the shape of the body. Examples include, but are not limited to fingerprint, palm veins, face recognition, DNA, palm print, hand geometry, iris recognition, retina and odor/scent. Behavioral characteristics are related to the pattern of behavior of a person, including but not limited to typing rhythm, gait, and voice. Some researchers have coined the term behaviometrics to describe the latter class of biometrics. (www.wikipedia.org/wiki/Biometrics)

Bot: a robotic machine software related process, usually involving automatically running scanning software, which can be employed for the malicious purpose of capturing and hijacking secret authentication data like passwords, etc.

CAPTCHA: (short for "Completely Automated Public Turing test to tell Computers and Humans Apart") is a type of challenge-response test used in computing to determine whether or not the user is human. The most common type of CAPTCHA was first invented in 1997 by Mark D. Lillibridge, Martin Abadi, Krishna Bharat, and *Andrei* Z. Broder. This form of CAPTCHA requires that the user type the letters of a distorted image, sometimes with the addition of an obscured sequence of letters or digits that appears on the screen. (www.wikipedia.org/wiki/CAPTCHA)

Hidden Transformation Input: an simple encryption algorithm is applied to actual password values in order to calculate temporary fake values which are input in place of the actual values, a process which helps obscure and hide the true password. The process can involve mental calculations by the user or simple pre-calculated visual offset maps. Example of this traditional method are seen in U.S. Pat. No. 7,725,712 B2, U.S. Pat. No. 6,549,194 B1, U.S. Pat. No. 7,698,563 B2.

Keylogger, Key Logger: Keystroke logging, often referred to as keylogging or keyboard capturing, is the action of recording (logging) the keys struck on a keyboard, typically covertly, so that the person using the keyboard is unaware that their actions are being monitored (www.wikipedia.org/wiki/Keystroke_logging)

Digital Footprints: There are two main classifications for digital footprints: passive and active. A passive digital footprint is created when data is collected without the owner knowing, whereas active digital footprints are created when personal data is released deliberately by a user for the purpose of sharing information about oneself by means of websites or social media (www.wikipedia.org/wiki/Digital_footprint)

Display: typically a computer virtual screen device. But can refer to any type of dynamic digital content display apparatus which can be visually perceived by a person, for example a bio or neural implant device which directly stimulates the optic nerve or brain regions in visual perception; or a device which projects an image directly into the user's eye, for example a head-up display (HUD), glasses, contact lenses, or other gaming device, etc.

Emoticon: An emoticon is a pictorial representation of a facial expression using punctuation marks, numbers and letters, usually written to express a person's feelings or mood.

a. (www.wikipedia.org/wiki/Emoticon)

Passcode: normally used interchangeably with "password" in this context.

Passphrase: a sequence of words or other text used to control access to a computer system, program or data. A passphrase is similar to a password in usage, but is generally longer for added security. Passphrases are often used to control both access to, and operation of, cryptographic programs and systems, especially those that derive an encryption key from a passphrase.

Pfragment: an abbreviation for "password fragment" or "password segment", consisting of one or more alphanumeric characters, graphical symbols, emoticons, pictographs, pictograms, images, or video clips, etc. (or just "values"), representing any subset group of contiguous password elements that form a component piece of a password or passcode. And where alphanumeric characters normally map to standard Unicode values. The term may also be used interchangeably with pfragment-img, when used in the context of pfragment visual display.

Pfragment-img: an abbreviation for "password fragment image", a graphical, normally digital virtual display of a pfragment value, usually on a computer device display or screen.

Pfragment Element: any individual, discreet element of a pfragment.

Pfragment Menu: a display or screen showing one or more pfragments in an obfuscated or visually challenging manner, such than only an authorized password owner can correctly recognize and identify valid pfragments in a correct sequence order.

Pfragment (or Psegment) Sequence Order: a set of pfragments representing a related group of password element groups (or fragments) derived from a single common password, where each fragment (pfragment) represents a component piece of a parent password; and where each pfragment consists of a group of elements or characters in the original sequence order of their parent password. For example, the password "helloWorld" can be broken into pfragment component group "he", "llo", "Wo", "rld". When each of the related pfragments are incrementally appended to one another, from left to right in their original relative sequence order, they form the complete original password.

Pointer: any device or mechanism used to interact with a computer user interface (UI), such as a mouse, fingers on a touch screen or track pad, a gaming joy stick, sensor devices which track real time body movements like eye moments, hand and/or finger motions and gestures in 2D or 3D space, which might involve gloves or bio-implant devices, biosensors which read neural or nerve impulses, thoughts or brain waves, neural implant devices which sense neural activity, etc.

Psegment: short for "password segment", used interchangeably with "password fragment" or "pfragment".

Spring Loaded Menu (SLM): a type of computer user interface where menus are displayed on a virtual screen or display by the presence of a pointer in a particular display trigger zone, and are hidden by the absence of the pointer in the trigger zone; Such menus offer a "look ahead" preview to the user of the next menu choices. Such user interfaces can be space saving by displaying menus in alternating fashions.

Spoof or Spoofing Attack: an attempt to steal a password or other unique identity information to gain unauthorized access or use of a protected system such as a computer, a device or physical facility. www.wikipedia.org/wiki/Spoofing_attack Touch: a physical touch selection gesture or indicator, which in this context can also refer to tapping or touching, then holding and pressing down, or combinations of aforementioned, and where "touching" can also mean a touch thought, neural or nerve impulse or virtual "touch" gesture in a 3D virtual reality or holographic scenario.

Subliminal Recognition: Recognition that occurs below the threshold of consciousness;

but intense enough to influence the mental processes or the behavior of the individual, including unconscious but subtly measurable physiological processes.

(www.dictionary.com/browse/subliminal)

Touch: a physical finger or pointer device selection gesture, which in this context can also mean a touch thought, neural or nerve impulse, or a virtual touch movement gesture in a 3D virtual reality or holographic technology.

User Interface (UI or GUI): also referred to as human—computer interface and man-machine interface (MMI), or graphical user interface (GUI). (www.wikipedia.org/wiki/User_interface)

Unicode: a computing industry standard for the consistent encoding, representation, and handling of text expressed in most of the world's writing systems. Unicode contains a repertoire of more than 120,000 characters covering 129 modern and historic scripts, as well as multiple symbol sets. In text processing, Unicode takes the role of providing a unique code point—a number, not a glyph—for each character. Unicode represents a character in an abstract way and leaves the visual rendering (size, shape, font, or style) to other software, such as a web browser or word processor. (www.wikipedia.org/wiki/Unicode)

The invention claimed is:

1. A computer-implemented method of authenticating a permitted use of a computer device, the method comprising the following steps:

1 A user possessing the computer device comprising a microchip, a display and data that is only accessed by the user after authentication that the user knows a password code which can be deconstructed into two or more pfragments which can only reconstruct the password code in a specific order whereby selection of the pfragments in the specific order demonstrates knowledge of the password code;

2 The computer device presenting the pfragments to the user on the display in a dynamically obfuscated method;

3 The user selecting two or more pfragments in a selected order from the presentation on the display;

4 The computer device verifying the pfragments selected by the user and the order of the pfragment selection by the user is the pfragments of step 1 and the specific order of step 1 which demonstrate knowledge of the password code;

5 The computer device permitting access to the user to the data which is only accessed by the user after authentication.

2. The computer-implemented method of claim 1, wherein in step 2, at least one complete set of pfragments are displayed in correct sequence order of the password code in a contiguous sequence.

3. The computer-implemented method of claim 1, wherein in step 2, at least one decoy element is presented to the user on the display.

4. The computer-implemented method of claim 3, wherein in step 2, wherein at least one decoy element and pfragment is presented to the user in a contiguous sequence.

5. The computer-implemented method of claim 4, wherein in step 2, at least two pfragments are displayed in a contiguous sequence wherein the displayed pfragments are arranged in an incorrect sequence order of the password code.

6. The computer-implemented method of claim 3, wherein after step 4 cannot be completed, a subsequent authentication attempt is made beginning with step 1 and wherein in the repeated operation of step 2, the display location of at least one pfragment or decoy element has changed from display location of the element during the first operation of step 2.

7. The computer-implemented method of claim 3, wherein in step 2, at least one pfragment or one decoy element is displayed overlapping with the display of another pfragment or decoy element.

8. The computer-implemented method of claim 1, wherein in step 2, at least two pfragments are displayed in a plurality of angles of rotation, perspectives, curvature, shape, or topological distortions.

9. The computer-implemented method of claim 1, wherein in step 2, at least two pfragments are displayed in a plurality of sizes, fonts, styles or colors.

10. The computer-implemented method of claim 1, wherein in step 2, at least two pfragments are displayed to the user at different times.

11. The computer-implemented method of claim 1, wherein in step 3, the user selects two or more pfragments using pointer motions which trace a path to indicate the plurality of pfragments selected.

12. The computer-implemented method of claim 11, wherein in step 3, the path is not straight.

13. The computer-implemented method of claim 12, wherein in step 1, the specific order of selection does not permit the path to pass through any decoy element.

14. The computer-implemented method of claim 12, wherein in step 1, the specific order of selection requires the path to pass through at least one decoy element.

15. The computer-implemented method of claim 12, wherein the pointer motion that trace a path to indicate the pfragments selected is offset a short distance from display of the pfragment selected.

16. The computer-implemented method of claim 12, wherein in step 3, the path intersects with itself.

17. The computer-implemented method of authenticating of claim 16, wherein step 1 data can only be accessed by the user after authentication that the user additionally knows a particular geometric shape;

and wherein in step 4, the computer device also verifies the portion of the trace path beginning and ending at the trace path intersection is confirmed by the computer device to match the geometric shape of step 1.

* * * * *